United States Patent
Higuchi

(10) Patent No.: US 10,838,578 B2
(45) Date of Patent: Nov. 17, 2020

(54) DISPLAY CONTROL DEVICE AND DISPLAY CONTROL METHOD THAT ASSIGNS A SEARCH TARGET TO A DISPLAY AREA IN ACCORDANCE WITH A POSITIONAL RELATIONSHIP BETWEEN THE DISPLAY AREA AND THE SEARCH TARGET

(71) Applicant: Mitsubishi Electric Corporation, Tokyo (JP)

(72) Inventor: Hirohiko Higuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/487,658

(22) PCT Filed: Apr. 18, 2017

(86) PCT No.: PCT/JP2017/015583
§ 371 (c)(1),
(2) Date: Aug. 21, 2019

(87) PCT Pub. No.: WO2018/193516
PCT Pub. Date: Oct. 25, 2018

(65) Prior Publication Data
US 2020/0064983 A1 Feb. 27, 2020

(51) Int. Cl.
*G06F 3/0481* (2013.01)
*G01C 21/36* (2006.01)
(Continued)

(52) U.S. Cl.
CPC ..... *G06F 3/04817* (2013.01); *G01C 21/3673* (2013.01); *G09G 5/373* (2013.01);
(Continued)

(58) Field of Classification Search
CPC ....... G06F 3/04817; G06F 2203/04803; G06F 2203/04804; G06F 16/00; G01C 21/3673; G09G 5/373; G09G 5/377; G09G 2340/12
See application file for complete search history.

(56) References Cited

U.S. PATENT DOCUMENTS

| 7,076,741 B2 | 7/2006 | Miyaki |
| 9,575,992 B2 * | 2/2017 | Bolin .................. G01C 21/367 |

(Continued)

FOREIGN PATENT DOCUMENTS

| JP | 2009-169533 A | 7/2009 |
| JP | 2009-210446 A | 9/2009 |

(Continued)

OTHER PUBLICATIONS

International Search Report, issued in PCT/JP2017/015583, PCT/ISA/210, dated May 30, 2017.
(Continued)

*Primary Examiner* — Maurice L. McDowell, Jr.
(74) *Attorney, Agent, or Firm* — Birch, Stewart, Kolasch & Birch, LLP

(57) ABSTRACT

A display control device (1) includes a priority assigning unit (12) for assigning a priority to each of multiple display areas arranged in a grid pattern, a position information acquiring unit (13) for acquiring position information indicating the position of each of one or more search targets in a search region, a search target assigning unit (14) for assigning a search target to a display area on a one-to-one basis in order of descending priority according to a positional relationship between the display areas and the one or more search targets, and a display control unit (15) for generating an image for display where a first icon image corresponding to a search target is arranged in a display area on the basis of an assignment result provided by the search
(Continued)

target assigning unit (14), and for causing a display device (4) to display a screen including the image for display.

14 Claims, 15 Drawing Sheets

(51) Int. Cl.
 *G09G 5/373* (2006.01)
 *G09G 5/377* (2006.01)
(52) U.S. Cl.
 CPC ... *G09G 5/377* (2013.01); *G06F 2203/04803* (2013.01); *G06F 2203/04804* (2013.01); *G09G 2340/12* (2013.01)

(56) References Cited

U.S. PATENT DOCUMENTS

| | | | |
|---|---|---|---|
| 2004/0204821 A1* | 10/2004 | Tu | G01C 21/3679 701/527 |
| 2009/0110302 A1* | 4/2009 | Snow | G06T 17/05 382/225 |
| 2009/0169060 A1* | 7/2009 | Faenger | G09B 29/007 382/113 |
| 2010/0248745 A1 | 9/2010 | Ozawa et al. | |
| 2015/0356763 A1* | 12/2015 | Fulks | G06T 11/00 345/629 |
| 2018/0301111 A1 | 10/2018 | Park et al. | |

FOREIGN PATENT DOCUMENTS

| | | |
|---|---|---|
| JP | 2010-236919 A | 10/2010 |
| WO | WO 2018/200114 A1 | 12/2016 |

OTHER PUBLICATIONS

German Office Action, dated Jun. 9, 2020, for German Application No. 112017007272.7, with an English translation.

* cited by examiner

DISPLAY CONTROL DEVICE AND DISPLAY CONTROL METHOD THAT ASSIGNS A SEARCH TARGET TO A DISPLAY AREA IN ACCORDANCE WITH A POSITIONAL RELATIONSHIP BETWEEN THE DISPLAY AREA AND THE SEARCH TARGET

TECHNICAL FIELD

The present disclosure relates to a display control device and a display control method.

BACKGROUND ART

Conventionally, a screen design to display the positions of search targets such as various facilities, and pieces of information about the search targets in a display device for navigation systems has been developed. Concretely, for example, a screen design to superimpose an icon image corresponding to each search target on a map image has been developed.

In conventional screen designs, as the arrangement density of search targets on a map increases, the arrangement density of icon images in the screen also increases. Therefore, a problem is that there occurs a state in which icon images overlap one another, and it becomes difficult to visually grasp the positions of search targets, and so on, more specifically, the visibility of the screen is reduced. In contrast, as the arrangement density of search targets on a map decreases, the arrangement density of icon images in the screen also decreases. Therefore, a problem is that there occurs a state in which the spacing between icon images becomes large, and a scroll amount or a zoom amount that is needed in order to visually grasp the positions of all search targets, and so on increases, more specifically, the browsability of the screen is reduced.

To solve these problems, a map information display device of Patent Literature 1 visually divides a display area of a display unit into multiple divided areas, and, when producing a screen display of a map, determines in which divided area each spot on the map is to be located, and causes information about each spot included in a divided area to be displayed in this divided area in a list form. As a result, both a rough position of each spot and a certain amount of information about each spot can be acquired (refer to the abstract of Patent Literature 1, FIG. 11, and so on).

CITATION LIST

Patent Literature

Patent Literature 1: JP 2009-210446 A

SUMMARY OF INVENTION

Technical Problem

In the map information display device of Patent Literature 1, there is a one-to-one correspondence between the multiple divided areas on the screen and multiple areas on the map (refer to FIG. 12 and so on of Patent Literature 1), and multiple spots may be included in each of the divided areas. Therefore, a problem is that in a divided area corresponding to an area where the arrangement density of spots is low, the number of spots included in the divided area becomes zero, and the display of this divided area is useless (refer to the display of "not applicable" in FIG. 11 of Patent Literature 1). A problem is that, in contrast, in a divided area corresponding to an area where the arrangement density of spots is high, the total number of spots included in the divided area becomes large, and the number of spots for which information cannot be displayed in a single screen is large (refer to the display of "others (two spots)" in FIG. 11 of Patent Literature 1).

More specifically, a problem is that while the screen design provided by the map information display device of Patent Literature 1 improves the visibility in the case in which the arrangement density of spots is high more than that in conventional screen designs, the browsability in this case is reduced.

The present disclosure is made in order to solve the above-mentioned problems, and it is therefore an object of the present disclosure to provide a display control device and a display control method capable of achieving both visibility and browsability in a display screen irrespective of the arrangement density of search targets on a map.

Solution to Problem

A display control device of the present disclosure includes: a priority assigning unit for assigning a priority to each of multiple display areas arranged in a grid pattern; a position information acquiring unit for acquiring position information showing the position of each of one or more search targets existing in a search region; a search target assigning unit for assigning a search target to a display area on a one-to-one basis in order of descending priority in accordance with a positional relationship between the display areas and the one or more search targets; and a display control unit for generating an image for display in which a first icon image corresponding to a search target is arranged in a display area on the basis of an assignment result provided by the search target assigning unit, and for causing a display device to display a screen including the image for display, wherein the priority assigning unit assigns the priority in such a way that the priority gradually becomes lower with increasing distance from a reference position, and wherein the search target assigning unit calculates a first vector indicating a direction of a center of each of the display areas with respect to the reference position, a second vector indicating a direction of each of the one or more search targets with respect to the reference position, and a distance from the reference position to each of the one or more search targets, and assigns, to the display area in order of descending priority, the search target having a smallest evaluated value that depends on the distance thereof, out of yet-to-be-assigned search targets in each of which an angle value between the first vector and the second vector is less than an allowable angle value.

Advantageous Effects of Invention

According to the present disclosure, because the configuration is provided as above, both visibility and browsability in the display screen can be achieved irrespective of the arrangement density of search targets on a map.

DESCRIPTION OF EMBODIMENTS

Hereafter, in order to explain the present disclosure in greater detail, embodiments of the present disclosure will be described with reference to the accompanying drawings.

Embodiment 1

Figure 1:
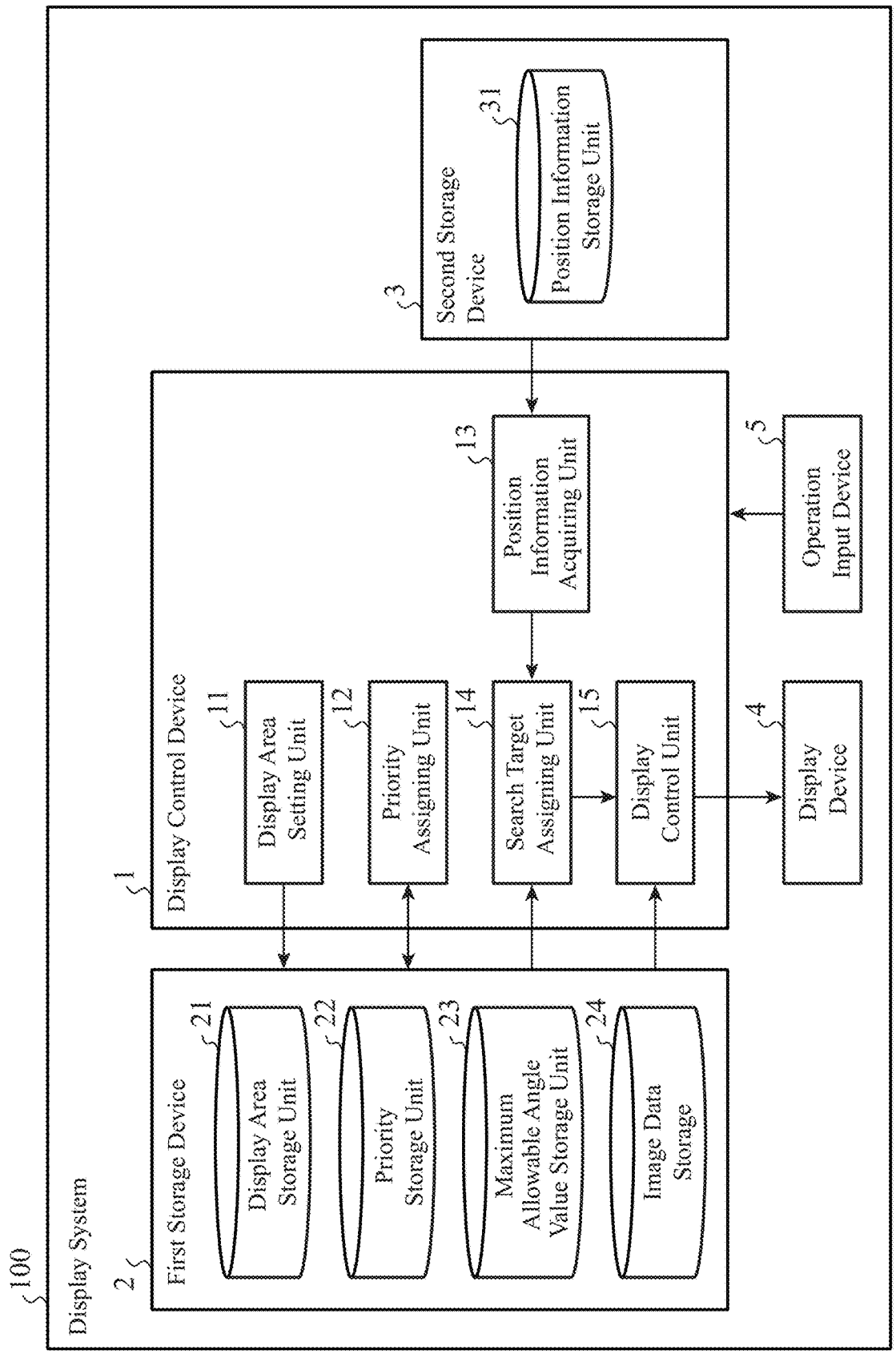
FIG. 1 is a block diagram showing a main part of a display control device according to Embodiment 1 of the present disclosure, and a main part of a display system including the display control device.
Figure 2:
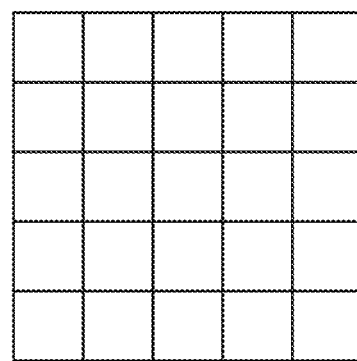
FIG. 2 is an explanatory drawing showing an example of display areas set up by a display area setting unit according to Embodiment 1 of the present disclosure.
Figure 3:
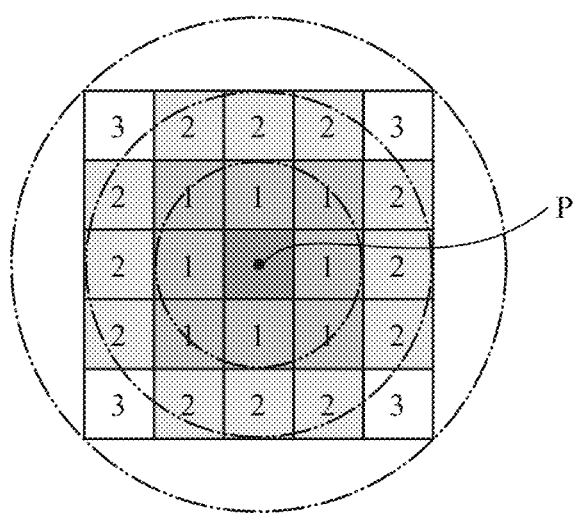
FIG. 3 is an explanatory drawing showing an example of priorities that are assigned to the display areas shown in FIG. 2 by a priority assigning unit according to Embodiment 1 of the present disclosure.
Figure 4A:
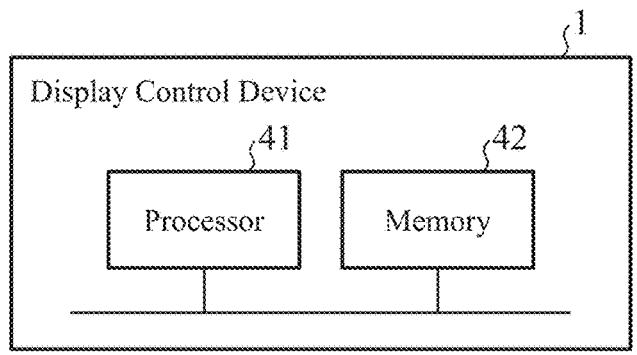
FIG. 4A is a block diagram showing a hardware configuration of the display control device according to Embodiment 1 of the present disclosure.
Figure 4B:
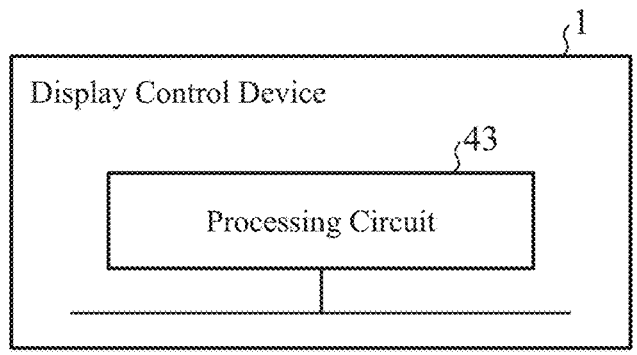
FIG. 4B is a block diagram showing another hardware configuration of the display control device according to Embodiment 1 of the present disclosure.

FIG. 1 is a block diagram showing a main part of a display control device according to Embodiment 1 of the present disclosure, and a main part of a display system including the display control device. FIG. 2 is an explanatory drawing showing an example of display areas set up by a display area setting unit according to Embodiment 1 of the present disclosure. FIG. 3 is an explanatory drawing showing an example of priorities that are assigned to the display areas shown in FIG. 2 by a priority assigning unit according to Embodiment 1 of the present disclosure. FIG. 4A is a block diagram showing a hardware configuration of the display control device according to Embodiment 1 of the present disclosure. FIG. 4B is a block diagram showing another hardware configuration of the display control device according to Embodiment 1 of the present disclosure. The display control device 1 of Embodiment 1 and the display system 100 including this display control device 1 will be explained by referring to FIGS. 1 to 4.

As shown in FIG. 1, the display system 100 includes a display device 4 and an operation input device 5. The display device 4 is constituted by, for example, a liquid crystal display or an organic electroluminescence (EL) display. The operation input device 5 is constituted by, for example, a touch panel integrated with the display device 4.

The display area setting unit 11 sets up multiple display areas arranged in a substantially grid pattern in accordance with an operation inputted to the operation input device 5. More concretely, the display area setting unit 11 sets up substantially polygon-shaped display areas arranged in a substantially polygonal grid pattern.

An example of the display areas set up by the display area setting unit 11 is shown in FIG. 2. In the example shown in FIG. 2, each display area is square-shaped, and 25 display areas in total are arranged in a square grid pattern having five rows and five columns.

A display area storage unit 21 stores information showing the display areas set up by the display area setting unit 11 (referred to as "display area information" hereafter).

The priority assigning unit 12 acquires the display area information stored in the display area storage unit 21, and assigns a priority to each of the multiple display areas indicated by this display area information. More concretely, the priority assigning unit 12 assigns a priority in such a way that the priority gradually becomes lower with increasing distance from a reference position P, on the basis of an algorithm preset to the priority assigning unit 12 or in accordance with an operation inputted to the operation input device 5.

An example of priorities assigned by the priority assigning unit 12 is shown in FIG. 3. In the example shown in FIG. 3, each of the priorities is set to have one of three-level values (1 to 3), and a smaller value shows a higher priority. In the example shown in FIG. 3, the priorities are assigned in such a way that each of them has a value becoming larger in the form of substantially concentric circles with increasing distance from the reference position P. These priorities are assigned on the basis of the algorithm preset to the priority assigning unit 12. In the example shown in FIG. 3, the display area corresponding to the reference position P is excluded from the targets for assignment of the priorities.

A priority storage unit 22 stores information indicating the priorities assigned by the priority assigning unit 12 (referred to as "priority information" hereafter).

A position information storage unit 31 stores information indicating the position of each of multiple search targets on a map (referred to as "position information" hereafter).

Concretely, for example, the display system 100 can be applied to a management system for equipment (referred to as an "equipment management system" hereafter) in a case in which a maintenance engineer patrols pieces of equipment, such as storage pumps or elevators, and performs inspection work and maintenance work on the pieces of equipment. In the case in which the display system 100 is applied to an equipment management system, pieces of equipment, such as storage pumps or elevators, are search targets. As an alternative, for example, the display system 100 can be applied to a navigation system for in-vehicle information terminals. In the case in which the display system 100 is applied to a navigation system for in-vehicle information terminals, facilities, such as parking lots, are search targets. As an alternative, for example, the display system 100 can be applied to a navigation system for mobile information terminals. In the case in which the display system 100 is applied to a navigation system for mobile information terminals, railway stations or the likes are search targets.

A position information acquiring unit 13 acquires position information indicating the position of each of one or more search targets existing in a predetermined region (referred to as a "search region" hereafter) out of the pieces of position information stored in the position information storage unit 31. The search region may be preset to the position information acquiring unit 13, or may be set up through an operation inputted to the operation input device 5. The position information acquiring unit 13 outputs the acquired position information to a search target assigning unit 14.

A maximum allowable angle value storage unit 23 stores a maximum allowable angle value $\chi$. The maximum allowable angle value $\chi$ is preset and is used when the search target assigning unit 14 assigns a search target to a display area.

The search target assigning unit 14 acquires the display area information stored in the display area storage unit 21, the priority information stored in the priority storage unit 22, the maximum allowable angle value $\chi$ stored in the maximum allowable angle value storage unit 23, and the position information outputted by the position information acquiring unit 13. The search target assigning unit 14 uses these pieces of information to assign a search target to a display area on a one-to-one basis in order of descending priority on the basis of a positional relationship between the display areas and the one or more search targets.

More specifically, when the assignment by the search target assigning unit 14 is completed, there occurs a state in which there is a one-to-one correspondence between at least one of the above-mentioned multiple display areas and at least one of the above-mentioned one or more search targets. When, for example, the total number of display areas is larger than the total number of search targets, there may occur a state in which no search targets are assigned to some display areas having a low priority. In contrast, when, for example, the total number of display areas is smaller than the total number of search targets, because there occurs a state in which some search targets are assigned to neither of the display areas, the search targets that are not assigned are hidden.

Figure 6:
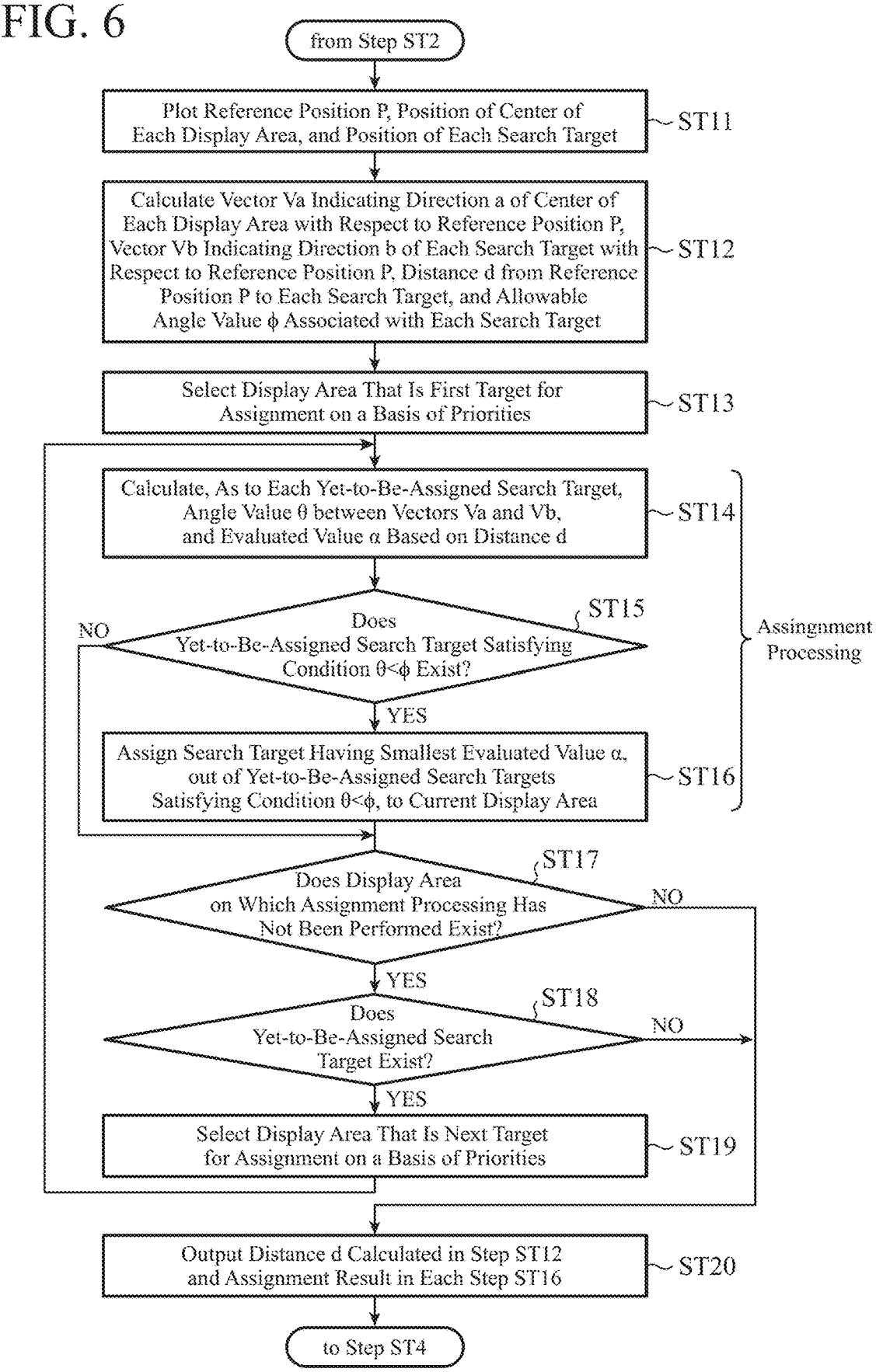
FIG. 6 is a flowchart showing the detailed operation of a search target assigning unit according to Embodiment 1 of the present disclosure.

The details of processing for, in the search target assigning unit 14, assigning a search target to a display area will be mentioned later by referring to a flowchart of FIG. 6. In the course of this processing, a distance d from a reference position P to each search target is calculated. The search target assigning unit 14 outputs an assignment result and the distance d to the display control unit 15.

An image data storage 24 stores image data about an icon image corresponding to each search target. This image data is used for generation of an image for display that is performed by the display control unit 15.

The display control unit 15 acquires the display area information stored in the display area storage unit 21, the image data stored in the image data storage 24, and the assignment result and the distance d that are outputted by the display control unit 15. The display control unit 15 generates an image for display by using these pieces of information. The image for display is one in which the icon image corresponding to each search target is arranged in a display area corresponding to the search target on the basis of the assignment result provided by the search target assigning unit 14.

At this time, the display control unit 15 causes the icon image corresponding to each search target to be displayed in a different display mode depending on the distance d from the reference position P to the search target. Concretely, for example, the display control unit 15 decreases the size of the icon image with increase in the distance d. As an alternative, for example, the display control unit 15 increases the degree of transparency of the icon image with increase in the distance d. As an alternative, for example, the display control unit 15 increases the degree of transparency while decreasing the size of the icon image with increase in the distance d.

Further, the display control unit 15 causes the display device 4 to display a screen including the generated image for display. More concretely, the display control unit 15 causes the display device 4 to display a screen including the inside of at least a region (referred to as a "region to be displayed" hereafter) of the image for display. The region to be displayed may be preset to the display control unit 15, or may be set up through an operation inputted to the operation input device 5.

A first storage device 2 is constituted by the display area storage unit 21, the priority storage unit 22, the maximum allowable angle value storage unit 23, and the image data storage 24. A second storage device 3 is constituted by the position information storage unit 31. As each of the first and second storage devices 2 and 3, for example, an auxiliary storage device, such as a hard disk drive (HDD) or a solid state drive (SSD), is used.

The display control device 1 is constituted by the display area setting unit 11, the priority assigning unit 12, the position information acquiring unit 13, the search target assigning unit 14, and the display control unit 15. The display system 100 is constituted by the display control device 1, the first storage device 2, the second storage device 3, the display device 4, and the operation input device 5.

An example of the hardware configuration of the display control device 1 is shown in FIG. 4A. As shown in FIG. 4A, the display control device 1 is constituted by a computer, and has a processor 41 and a memory 42. In the memory 42, a program for causing the computer to function as the display area setting unit 11, the priority assigning unit 12, the position information acquiring unit 13, the search target assigning unit 14, and the display control unit 15, which are shown in FIG. 1, is stored. The functions of the display area setting unit 11, the priority assigning unit 12, the position information acquiring unit 13, the search target assigning unit 14, and the display control unit 15 are implemented by the processor 41's reading and execution of the program stored in the memory 42.

The processor 41 is constituted by, for example, a central processing unit (CPU), a graphics processing unit (GPU), a microprocessor, a microcontroller, or a digital signal processor (DSP). The memory 42 is constituted by, for example, a semiconductor memory such as a random access memory (RAM), a read only memory (ROM), a flash memory, an erasable programmable read only memory (EPROM), or an electrically erasable programmable read-only memory (EE-PROM).

Another example of the hardware configuration of the display control device 1 is shown in FIG. 4B. As shown in FIG. 4B, the functions of the display area setting unit 11, the priority assigning unit 12, the position information acquiring unit 13, the search target assigning unit 14, and the display control unit 15 may be implemented by a processing circuit 43 for exclusive use. The processing circuit 43 is, for example, an application specific integrated circuit (ASIC), a programmable logic device (PLD), a field-programmable gate array (FPGA), a system-on-a-chip (SoC), a system large-scale integration (LSI), or a combination of these devices.

The functions of the display area setting unit 11, the priority assigning unit 12, the position information acquiring unit 13, the search target assigning unit 14, and the display control unit 15 may be implemented by respective processing circuits 43, or the functions of the units may be implemented collectively by a processing circuit 43. Further, some functions of the display area setting unit 11, the priority assigning unit 12, the position information acquiring unit 13, the search target assigning unit 14, and the display control unit 15 may be implemented by the processor 41 and the memory 42 which are shown in FIG. 4A, and the remaining functions may be implemented by the processing circuit 43 shown in FIG. 4B.

Figure 5:
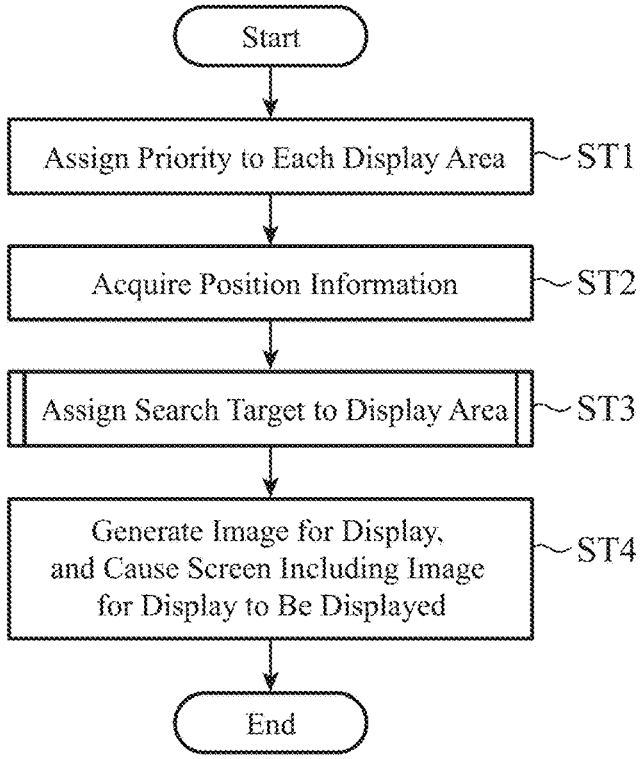
FIG. 5 is a flowchart showing the operation of the display control device according to Embodiment 1 of the present disclosure.

Next, the operation of the display control device 1 will be explained by referring to a flowchart of FIG. 5. It is assumed that when the display control device 1 starts a process of step ST1, display area information is already stored in the display area storage unit 21. Further, a maximum allowable angle value $\chi$ is stored in the maximum allowable angle value storage unit 23 in advance, image data is stored in the image data storage 24 in advance, and pieces of position information are stored in the position information storage unit 31 in advance.

First, in step ST1, the priority assigning unit 12 acquires the display area information stored in the display area storage unit 21, and assigns a priority to each of the multiple display areas shown by this display area information. More concretely, the priority assigning unit 12 assigns a priority in such a way that the priority gradually becomes lower with increasing distance from a reference position P on the basis of the algorithm preset to the priority assigning unit 12 or in accordance with an operation inputted to the operation input device 5.

Then, in step ST2, the position information acquiring unit 13 acquires the position information indicating the position of each of one or more search targets existing in a search region out of the pieces of position information stored in the position information storage unit 31. The position information acquiring unit 13 outputs the acquired position information to the search target assigning unit 14.

Then, in step ST3, the search target assigning unit 14 acquires the display area information stored in the display area storage unit 21, the priority information stored in the priority storage unit 22, the maximum allowable angle value $\chi$ stored in the maximum allowable angle value storage unit 23, and the position information that the position information acquiring unit 13 outputs in step ST2. The search target assigning unit 14 uses these pieces of information to assign a search target to a display area on a one-to-one basis in order of descending priority on the basis of a positional relationship between the display areas and the one or more search targets.

The details of a process of assigning a search target to a display area, in the search target assigning unit 14, will be mentioned later by referring to the flowchart of FIG. 6. In the course of the process, the distance d from the reference position P to each search target is calculated. The search target assigning unit 14 outputs an assignment result and the distance d to the display control unit 15.

Then, in step ST4, the display control unit 15 acquires the display area information stored in the display area storage unit 21, the image data stored in the image data storage 24, and the assignment result and the distance d that the search target assigning unit 14 outputs in step ST3. The display control unit 15 generates an image for display by using these pieces of information. The image for display is one in which an icon image corresponding to each search target is arranged in a display area corresponding to the search target on the basis of the assignment result provided by the search target assigning unit 14.

At this time, the display control unit 15 causes the icon image corresponding to each search target to be displayed in a different display mode depending on the distance d from the reference position P to the search target. Concretely, for example, the display control unit 15 makes the size of the icon image smaller with increase in the distance d. As an alternative, for example, the display control unit 15 makes the degree of transparency of the icon image higher with increase in the distance d. As an alternative, for example, the display control unit 15 makes the size of the icon image smaller and makes the degree of transparency of the icon image higher with increase in the distance d.

Further, in step ST4, the display control unit 15 causes the display device 4 to display a screen including the generated image for display. More concretely, the display control unit 15 causes the display device 4 to display a screen including the inside of the region to be displayed of the image for display.

Next, the details of the process of step ST3 performed by the search target assigning unit 14 will be explained by referring to the flowchart of FIG. 6.

First, in step ST11, the search target assigning unit 14 plots the reference position P, the position of the center of each display area, and the position of each search target in an identical two-dimensional coordinate system. At this time, the search target assigning unit 14 plots the position of each search target in the two-dimensional coordinate system in such a way that the position of a reference point P' on a map matches the reference position P.

The reference point P' is set up in accordance with the application of the display system 100, or the like. Concretely, for example, in a case in which the display system 100 is applied to an equipment management system, a point corresponding to equipment that needs quickly dispatch of a maintenance engineer, or the like is set as the reference point P'. As an alternative, for example, in a case in which the display system 100 is applied to a navigation system for an in-vehicle information terminal, a point corresponding to the current position of a vehicle in which the in-vehicle information terminal is mounted, or the like is set as the reference point P'. As an alternative, for example, in a case in which the display system 100 is applied to a navigation system for a mobile information terminal, a point corresponding to a station closest to the current position of the mobile information terminal, or the like is set as the reference point P'.

The position of the reference point P' is inputted through, for example, an operation on the operation input device 5 in advance of the process of step ST11 performed by the search target assigning unit 14. As an alternative, for example, in step ST2, the position information acquiring unit 13 may acquire position information indicating the position of the reference point P', in addition to the position information indicating the position of each search target, from the position information storage unit 31, and output the pieces of position information to the search target assigning unit 14.

Then, in step ST12, the search target assigning unit 14 calculates a vector Va indicating the direction a of the center of each display area with respect to the reference position P (may be referred to as a "first vector" hereafter), and a vector Vb indicating the direction b of each search target with respect to the reference position P (may be referred to as a "second vector" hereafter). More specifically, multiple first vectors Va whose number is equal to the number of display areas and one or more second vectors Vb whose number is equal to the number of search targets existing in the search region are calculated.

Further, the search target assigning unit 14 calculates the distance d from the reference position P to each search target in accordance with the following equation (1). The search target assigning unit 14 further calculates an allowable angle value $\phi$ associated with each search target in accordance with the following equation (2). More specifically, one or more distances d and one or more allowable angle values $\phi$, the number of distances and the number of allowable angle values being equal to the number of search targets existing in the search region, are calculated. In equation (2), $\beta$ is a predetermined coefficient, and $\chi$ is the maximum allowable angle value stored in the maximum allowable angle value storage unit 23.

$$d=|\vec{Vb}| \qquad (1)$$

$$\phi=\chi/(\beta*d) \qquad (2)$$

For example, when $\chi$=30 degrees, $\beta$=1, and d=1, $\phi$ is 30 degrees. Therefore, when a search target exists within a range having an angle of 30 degrees on any side of a straight line drawn from the reference position P to the center of a certain display area, the search target is set as a candidate for assignment to the display area. Similarly, when d=2, $\phi$ is 15 degrees. Therefore, when a search target exists within a range having an angle of 15 degrees on any side of a straight line drawn from the reference position P to the center of a certain display area, the search target is set as a candidate for assignment to the display area.

More specifically, by correcting $\chi$ to $\phi$ using equation (2), a search target closer to the reference position P is influenced less by the direction (angle) with respect to the reference position P. On the contrary, as the distance from the reference position P increases, the influence of the direction (angle) becomes greater, and therefore, to each display area, only a search target existing in a direction closer to a straight line drawn from the reference position P toward the center of the display area must be assigned. By changing the allowable angle value $\phi$ depending on the distance d, an arrangement expression that is close to a sense of direction that human beings grasp is provided.

Then, in step ST13, the search target assigning unit 14 selects a display area that is the first target for assignment, on the basis of the priorities. More concretely, the search target assigning unit 14 selects one display area out of display areas having the highest priority.

Then, in step ST14, as to both the display area selected in step ST13, and each of search targets that is not assigned to any display area (referred to as "yet-to-be-assigned search targets"), the search target assigning unit 14 calculates the angle value θ that the first vector Va forms with the second vector Vb in accordance with the following equation (3). Further, as to each of the yet-to-be-assigned search targets, the search target assigning unit 14 calculates an evaluated value a based on the distance d in accordance with the following equation (4). γ in equation (4) is a coefficient set up in accordance with the search region.

$$\theta = \arccos\left(\frac{\vec{Va} \cdot \vec{Vb}}{|\vec{Va}||\vec{Vb}|}\right)(0 \le \theta \le \pi) \tag{3}$$

$$\alpha = \theta + \gamma * d \tag{4}$$

Then, in step ST15, as to each of the yet-to-be-assigned search targets, the search target assigning unit 14 compares the angle value θ calculated in step ST14 and the allowable angle value φ calculated in step ST12. The search target assigning unit 14 determines whether there exists a yet-to-be-assigned search target satisfying a condition θ<φ.

When there exists a yet-to-be-assigned search target satisfying the condition θ<φ ("YES" in step ST15), the search target assigning unit 14, in step ST16, extracts a target to be searched having the smallest one of evaluated values α calculated in step ST14 out of yet-to-be-assigned search targets satisfying the condition θ<φ. The search target assigning unit 14 assigns the extracted search target to the display area selected in step ST13. Hereafter, the processes of steps ST14 to ST16 may be generically referred to as "assignment processing."

Figure 7A:
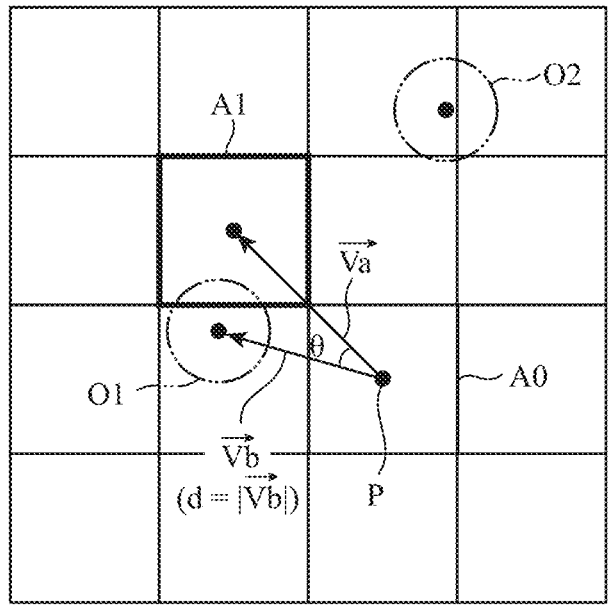
FIG. 7A is an explanatory drawing showing a first vector associated with a display area set as a target for assignment, a second vector associated with a yet-to-be-assigned search target, and an angle value between the first vector and the second vector.
Figure 7B:
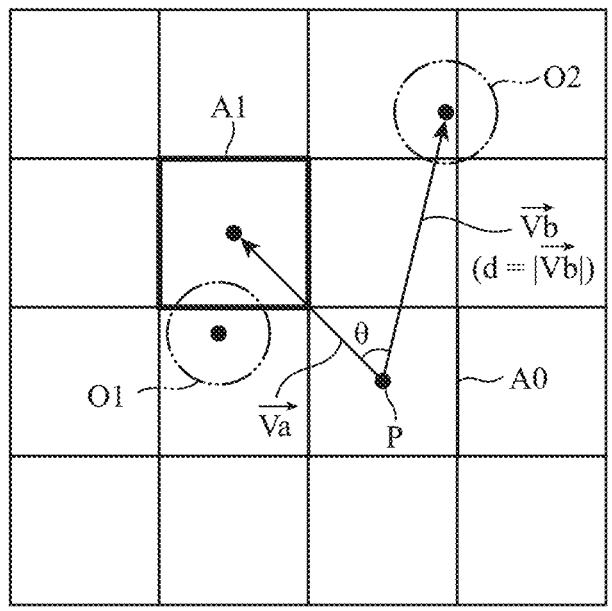
FIG. 7B is an explanatory drawing showing a first vector associated with the same display area as that of FIG. 7A, a second vector associated with a search target different from that of FIG. 7A, and an angle value between the first vector and the second vector.

A concrete example of the assignment processing is shown in FIG. 7. As shown in FIG. 7, a display area A1 arranged on an upper left side of the display area A0 corresponding to the reference position P is set as the target for assignment. At this time, it is assumed that yet-to-be-assigned search targets O1 and O2 exist, and the angle value θ associated with the search target O1 (refer to FIG. 7A) is less than the allowable angle value φ, and the angle value θ associated with the search target O2 (refer to FIG. 7B) is less than the allowable angle value φ. Because the distance d from the reference position P to the search target O1 is shorter than the distance d from the reference position P to the search target O2, as shown in FIG. 7, it is seen from the above-mentioned equation (4) that the evaluated value a of the search target O1 is smaller than the evaluated value a of the search target O2. In this case, the search target assigning unit 14 assigns the search target O1 having the smallest evaluated value α, out of the two search targets O1 and O2 satisfying the condition θ<φ, to the display area A1 (step ST16).

Then, in step ST17, the search target assigning unit 14 determines whether there exists a display area on which no assignment processing has been performed. When there exists a display area on which no assignment processing has been performed ("YES" in step ST17), the search target assigning unit 14, in step ST18, determines whether there exists a yet-to-be-assigned search target. When there exists a yet-to-be-assigned search target ("YES" in step ST18), the search target assigning unit 14, in step ST19, selects a display area that is the next target for assignment on the basis of the priorities. More concretely, the search target assigning unit 14 selects one of display areas having the highest priority out of display areas on each of which no assignment processing has been performed. Then, the search target assigning unit 14 performs the assignment processing (steps ST14 to ST16) on the display area selected in step ST19.

In contrast, when there does not exist a display area on which no assignment processing has been performed ("NO" in step ST17) or when there does not exist a yet-to-be-assigned search target ("NO" in step ST18), the search target assigning unit 14, in step ST20, outputs the distances d calculated in step ST12 and a result of the assignment that is performed in each execution of step ST16 to the display control unit 15. As a result, the process of step ST3 is completed.

Next, concrete examples of the image for display generated by the display control device 1 will be explained by referring to FIGS. 8 to 10. In the figures, a numeral displayed in an icon image corresponding to each search target shows an identifier assigned to the search target.

Figure 8A:
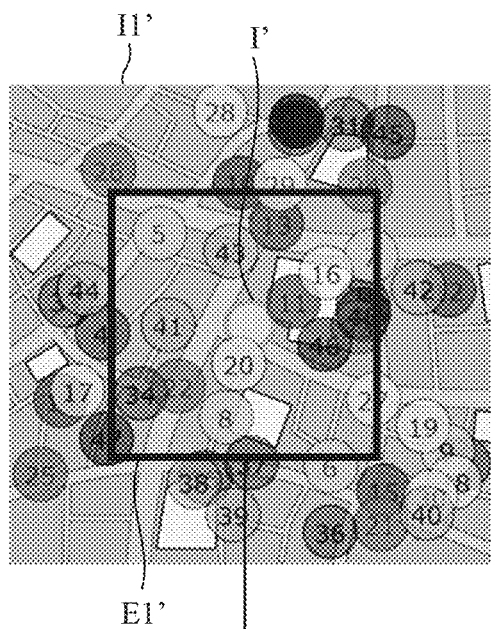
FIG. 8A is an explanatory drawing showing an example of an image for comparison generated by a conventional display control device.
Figure 9A:
FIG. 9A is an explanatory drawing showing another example of an image for comparison generated by a conventional display control device.
Figure 10A:
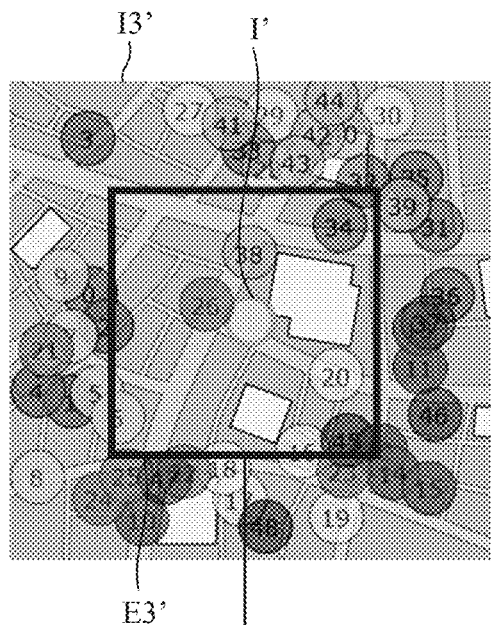
FIG. 10A is an explanatory drawing showing another example of an image for comparison generated by a conventional display control device.

FIGS. 8A, 9A, and 10A show, as objects for comparison with the image for display generated by the display control device 1, images I1' to I3' generated by a conventional display control device (referred to as "images for comparison" hereafter). More specifically, the images for comparison I1' to I3' are ones in each of which a circular icon image I' corresponding to a reference point P' and a circular icon image corresponding to each search target are superimposed on a map image on the basis of their positions indicated by position information.

Figure 8C:
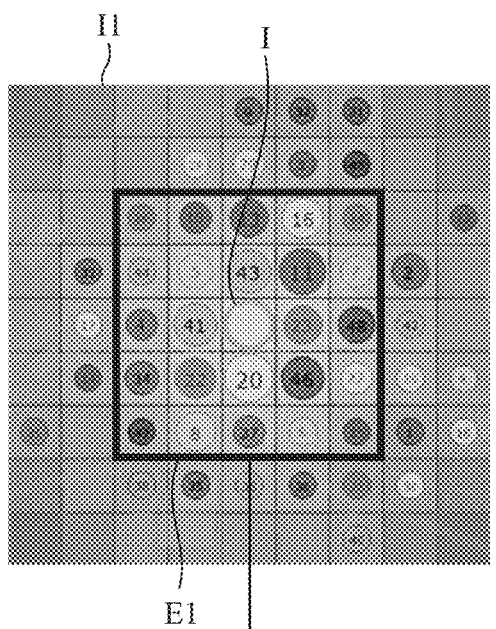
FIG. 8C is an explanatory drawing showing an example of an image for display generated by the display control device according to Embodiment 1 of the present disclosure.
Figure 8B:
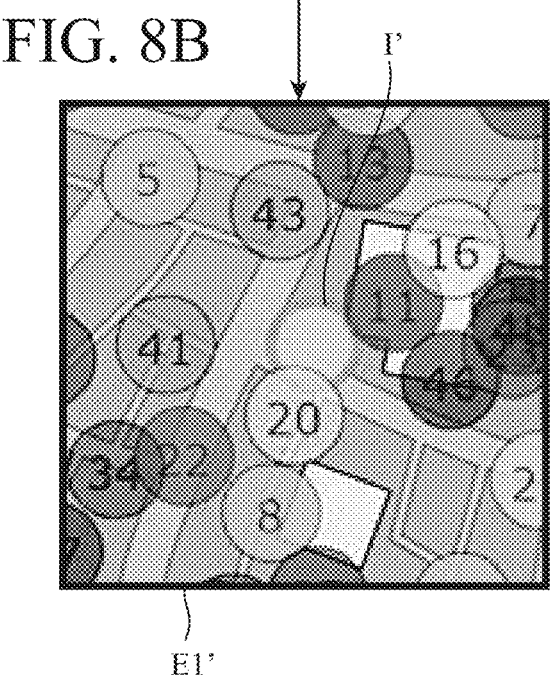
FIG. 8B is an explanatory drawing showing the inside of a region of the image for comparison shown in FIG. 8A, the region corresponding to a region to be displayed.
Figure 9B:
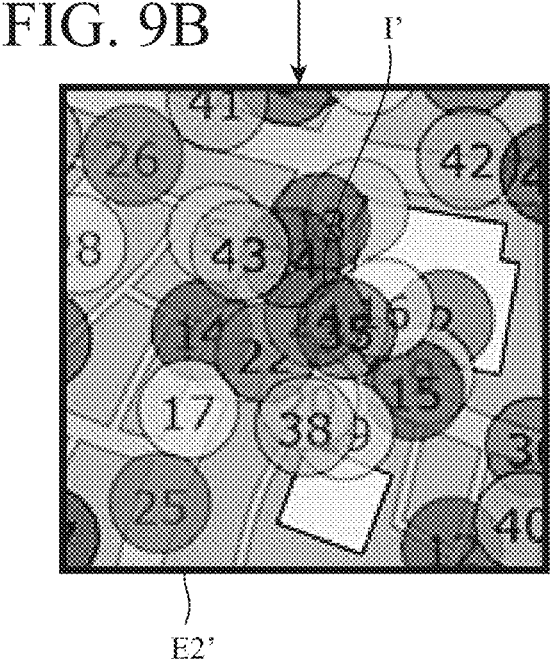
FIG. 9B is an explanatory drawing showing the inside of a region of the image for comparison shown in FIG. 9A, the region corresponding to a region to be displayed.
Figure 10C:
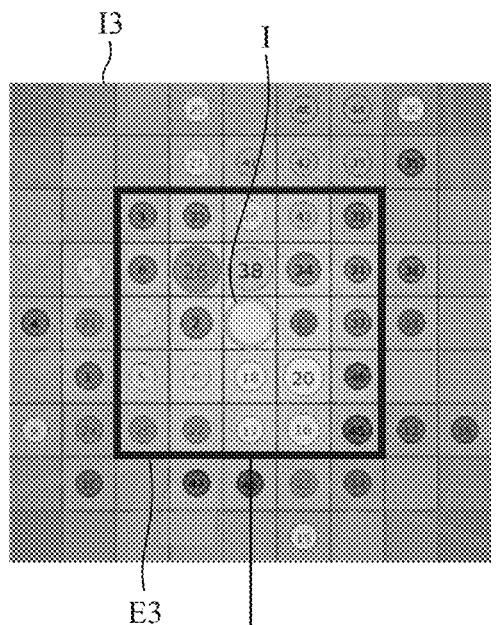
FIG. 10C is an explanatory drawing showing another example of the image for display generated by the display control device according to Embodiment 1 of the present disclosure.
Figure 10B:
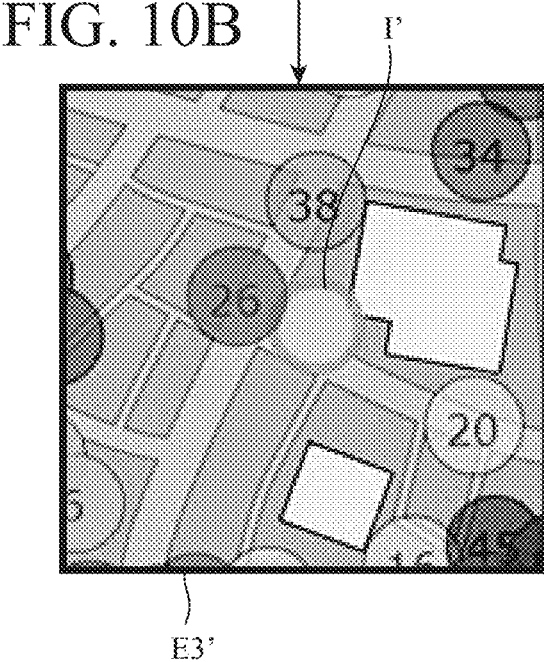
FIG. 10B is an explanatory drawing showing the inside of a region of the image for comparison shown in FIG. 10A, the region corresponding to a region to be displayed.

FIGS. 8B, 9B, and 10B show the insides of regions E1' to E3' corresponding to the regions to be displayed of the images for comparison I1' to I3'. In the example shown in each of the figures, the icon image I' corresponding to the reference point P' is arranged at the center of each of the regions E1' to E3'. The conventional display control device causes a display device to display a screen including each of the insides of the regions E1' to E3' of the images for comparison I1' to I3'.

Figure 8D:
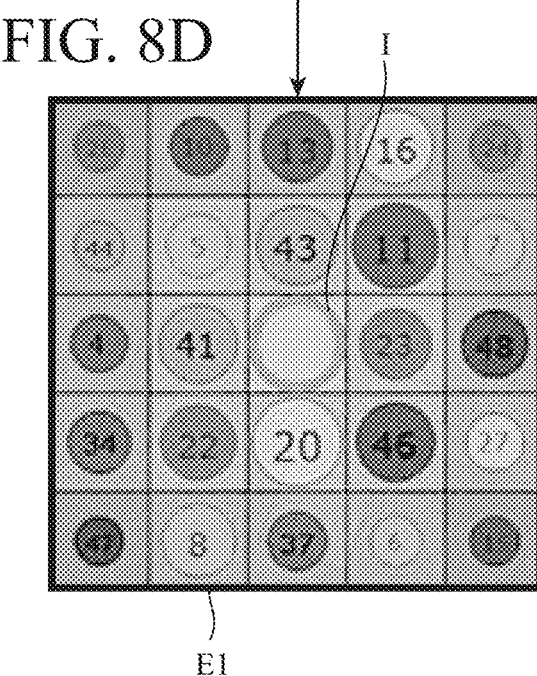
FIG. 8D is an explanatory drawing showing the inside of the region to be displayed of the image for display shown in FIG. 8C.
Figure 9C:
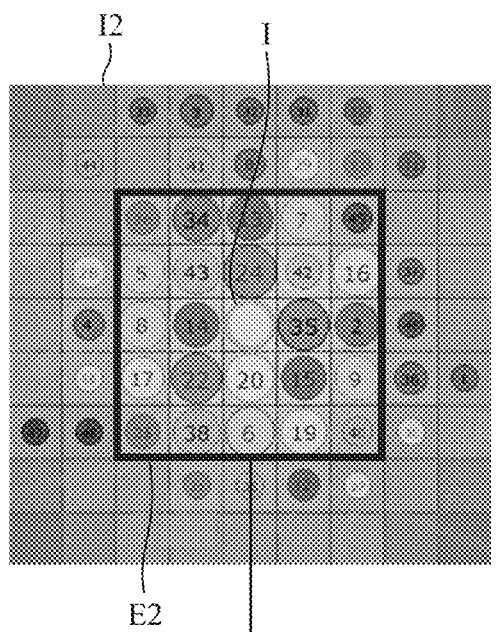
FIG. 9C is an explanatory drawing showing another example of the image for display generated by the display control device according to Embodiment 1 of the present disclosure.
Figure 9D:
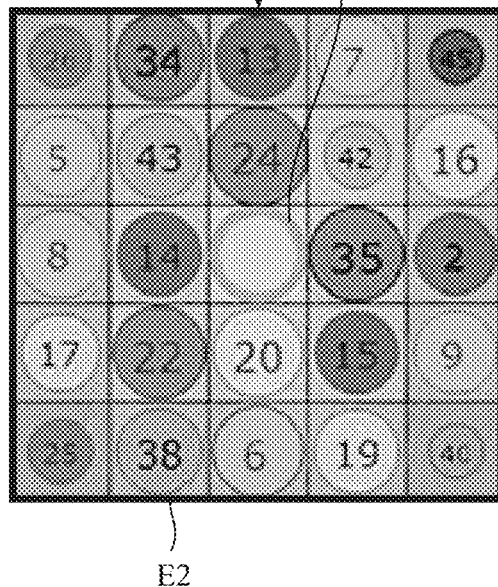
FIG. 9D is an explanatory drawing showing the inside of the region to be displayed of the image for display shown in FIG. 9C.
Figure 10D:
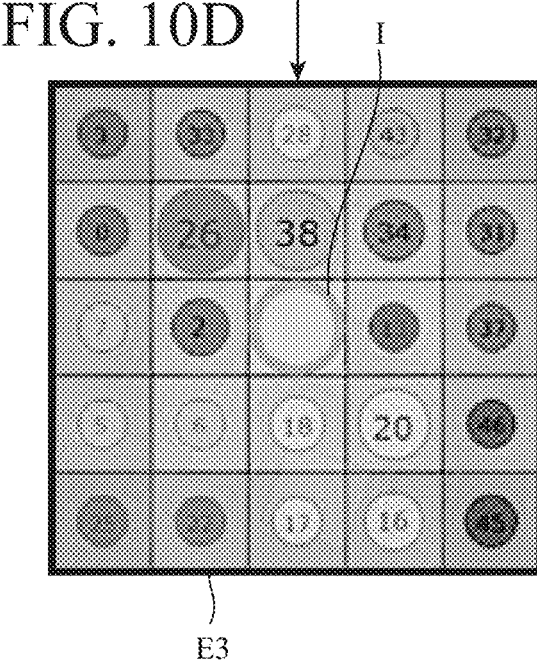
FIG. 10D is an explanatory drawing showing the inside of the region to be displayed of the image for display shown in FIG. 10C.

FIGS. 8C, 9C, and 10C show images for display I1 to I3 generated by the display control device 1 of Embodiment 1. More specifically, the image for display I1 is based on the same position information as that for the image for comparison I1', the image for display I2 is based on the same position information as that for the image for comparison I2', and the image for display I3 is based on the same position information as that for the image for comparison I3'. Further, an icon image I corresponds to the reference position P. FIGS. 8D, 9D, and 10D show the insides of the regions to be displayed E1 to E3 of the images for display I1 to I3. In the example shown in each of the figures, the icon image I corresponding to the reference point P is arranged at the center of each of the regions E1 to E3. The display control device 1 of Embodiment 1 causes the display device 4 to display a screen including the inside of each of the regions to be displayed E1 to E3 of the images for display I1 to I3.

In each display screen generated by the conventional display control device, the arrangement density of icon images in the display screen differs depending on the arrangement density of search targets in the vicinity of the reference point P'. More specifically, although when the arrangement density of search targets in the vicinity of the reference point P' is appropriate (FIG. 8A), the arrangement density of icon images in the display screen is also appropriate (FIG. 8B), when the arrangement density of search targets in the vicinity of the reference point P' is high (FIG. 9A), the arrangement density of icon images in the display screen is also high (FIG. 9B), and when the arrangement density of search targets in the vicinity of the reference point P' is low (FIG. 10A), the arrangement density of icon images in the display screen is also low (FIG. 10B). Therefore, a problem is that there occurs a state in which icon images overlap one another (FIG. 9B), and the visibility of the display screen is reduced. Another problem is that the number of icon images included in one single screen decreases (FIG. 10B), and the browsability of the display screen is reduced.

In contrast with this, the display control device 1 of Embodiment 1 can arrange icon images substantially uniformly in the display screen irrespective of the arrangement density of search targets in the vicinity of the reference point P' (FIGS. 8D, 9D, and 10D). More specifically, when the arrangement density of search targets in the vicinity of the reference point P' is high (FIG. 9A), by comparison with the screen (FIG. 9B) with the image for comparison I2', the state in which icon images overlap one another can be canceled (FIG. 9D). In contrast, when the arrangement density of search targets in the vicinity of the reference point P' is low (FIG. 10A), by comparison with the screen (FIG. 10B) with the image for comparison I3', icon images corresponding to search targets arranged further apart from the reference point P' can also be included in the single screen (FIG. 10D). Therefore, it is possible to achieve both the visibility and the browsability of the display screen irrespective of the arrangement density of search targets in the vicinity of the reference point P'.

Here, because the allowable angle value $\phi$ associated with each search target is calculated using the above-mentioned equation (2) (step ST12), there occurs a state in which the direction of the icon image corresponding to each search target with respect to the icon image I corresponding to the reference position P in the display screen substantially corresponds to the direction of each search target with respect to the reference point P' on the map. Here, "the state in which the direction of the icon image corresponding to each search target with respect to the icon image I corresponding to the reference position P in the display screen substantially corresponds to the direction of each search target with respect to the reference point P' on the map" means a state in which both the directions do not completely match each other, but correspond to each other to such an extent that, in human being's recognition, "it is felt somewhat that both the directions match each other." As a result, while both the visibility and the browsability are achieved as above, a screen design that makes it easy to intuitively grasp the direction of each search target with respect to the reference point P' can be implemented.

Further, because a priority is assigned in such a way that the priority gradually becomes lower with increasing distance from the reference position P (step ST1), and a search target having the smallest evaluated value a out of yet-to-be-assigned search targets satisfying the condition $\theta<\phi$ is assigned to each display area (step ST16), there occurs a state in which the distance from the icon image I corresponding to the reference position P in the display screen to the icon image corresponding to each search target substantially corresponds to the distance from the reference point P' to each search target on the map. Here, "the state in which the distance from the icon image I corresponding to the reference position P in the display screen to the icon image corresponding to each search target substantially corresponds to the distance from the reference point P' to each search target on the map" means a state in which both the distances are not completely equal to each other, but correspond to each other to such an extent that, in human being's recognition, "it is felt somewhat that both the distances are equal to each other." In addition, the display control unit 15 decreases the size of the icon image or increases the degree of transparency of the icon image with increase in the distance d calculated in step ST12 (step ST4). As a result, while both the visibility and the browsability are achieved as above, a screen design that makes it easy to intuitively grasp the distance from the reference point P' to each search target can be implemented. As a result, a screen design that makes it easy to compare the distances d from the reference position P to multiple search targets can be implemented.

Figure 11:
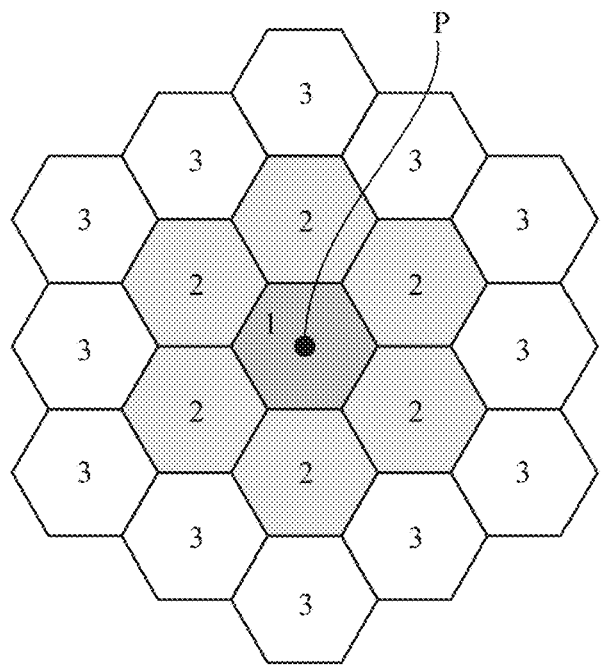
FIG. 11 is an explanatory drawing showing another example of the display areas set up by the display area setting unit according to Embodiment 1 of the present disclosure, and an example of the priorities that are assigned to the display areas by the priority assigning unit according to Embodiment 1 of the present disclosure.
Figure 12:
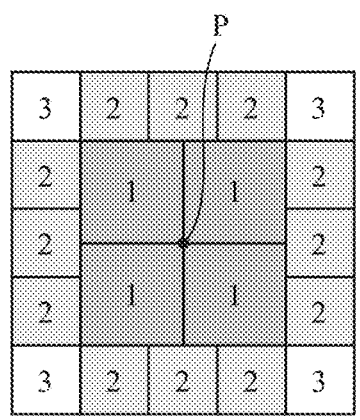
FIG. 12 is an explanatory drawing showing another example of the display areas set up by the display area setting unit according to Embodiment 1 of the present disclosure, and an example of the priorities that are assigned to the display areas by the priority assigning unit according to Embodiment 1 of the present disclosure.

The display areas set up by the display area setting unit 11 may just be substantially polygon-shaped ones arranged in a substantially polygonal grid pattern, and are not limited to square-shaped ones arranged in a square grid pattern. The display area setting unit 11 may set up, for example, hexagon-shaped display areas arranged in a hexagonal grid pattern (refer to FIG. 11) or triangle-shaped display areas arranged in a triangular grid pattern (not illustrated). Further, for example, the size of one or more of the multiple display areas may differ from those of the other display areas (refer to FIG. 12). Further, for example, the shape of one or more of the multiple display areas may differ from those of the other display areas (not illustrated).

More specifically, the meaning of the term of "grid pattern" described in claims of the present application is not limited to a perfect grid pattern, and also includes a meaning "substantially grid pattern." The meaning of the term of "polygonal grid pattern" described in claims of the present application is not limited to a perfect polygonal grid pattern, and also includes a meaning "substantially polygonal grid pattern." The meaning of the term of "polygon-shaped" described in claims of the present application is not limited to perfectly polygon-shaped, and also includes a meaning "substantially polygon-shaped."

Figure 13:
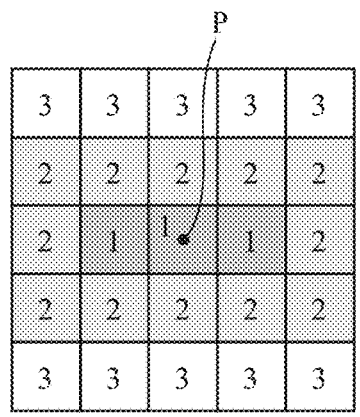
FIG. 13 is an explanatory drawing showing the same display areas as those shown in FIG. 2, and another example of the priorities that are assigned to the display areas by the priority assigning unit according to Embodiment 1 of the present disclosure.

Further, the priority assigning unit 12 may just assign a priority in such a way that the priority gradually becomes lower with increasing distance from the reference position P, and the method of assigning a priority is not limited to the one of assigning a value differing in the form of substantially concentric circles. Another example of the priorities assigned to the square-shaped display areas is shown in FIG. 13. Further, the setup of the priorities is not limited to the setup of three-level values, and can be the setup of two-level values or four-or-more-level values.

Further, the icon image corresponding to each search target may be freely constituted by a combination of multiple subicon images. In this case, the display control unit 15 may display one or more of the multiple subicon images that constitute each icon image in a different display mode (e.g., in a different size or with a different degree of transparency) depending on the distance d.

Concretely, for example, in the case in which the display system 100 is applied to an equipment management system, an icon image corresponding to equipment on which a maintenance engineer is performing either inspection work or maintenance work may be constituted by a combination of a subicon image showing the equipment and a subicon image showing the maintenance engineer, and an icon image corresponding to any other equipment may be constituted by only a subicon image showing the other equipment. Further, while the size or the degree of transparency of a subicon image showing each equipment, out of these subicon images, may differ depending on the distance d, the size and the degree of transparency of the subicon image showing the maintenance engineer may be fixed irrespective of the distance d.

Further, the display control unit 15 may generate an image for display including, in addition to icon images (may be referred to as "first icon images" hereafter) arranged on the basis of the assignment result provided by the search target assigning unit 14, icon images (may be referred to as "second icon images" hereafter) arranged on the basis of the positions shown by the position information. Further, in this case, the display control unit 15 may display both the first icon images and the second icon images in mutually different display modes (e.g., in mutually different colors, shapes, or sizes, or with mutually different degrees of transparency).

Concretely, for example, when only one or more of multiple search targets are assigned to display areas by the search target assigning unit 14, the display control unit 15 may generate an image for display including both a first icon image corresponding to a search target assigned to a display area and a second icon image corresponding to a search target not assigned to any display area. As an alternative, for example, when all search targets are assigned to display areas by the search target assigning unit 14, the display control unit 15 may generate an image for display including both a first icon image corresponding to each search target and a second icon image corresponding to each search target.

Figure 14:
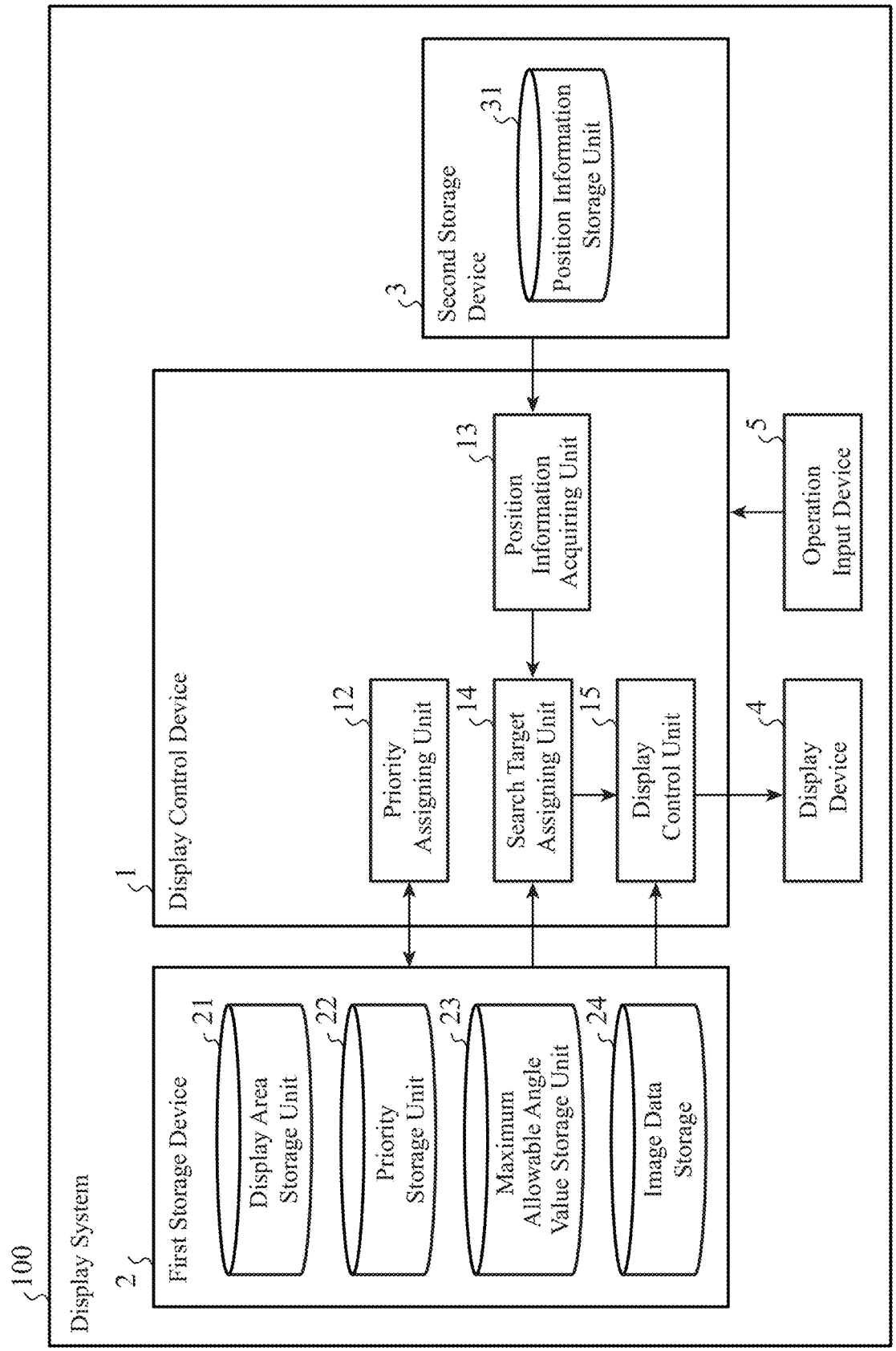
FIG. 14 is a block diagram showing a main part of another display control device according to Embodiment 1 of the present disclosure, and a main part of a display system including the other display control device.

Further, the display control device 1 may be one in which the display area setting unit 11 shown in FIG. 1 is eliminated (refer to FIG. 14). In this case, the display area storage unit 21 may store display areas preset when the display control device 1 is manufactured.

As mentioned above, the display control device 1 of Embodiment 1 includes: the priority assigning unit 12 that assigns a priority to each of multiple display areas arranged in a grid pattern; the position information acquiring unit 13 that acquires position information indicating the position of each of one or more search targets existing in a search region; the search target assigning unit 14 that assigns a search target to a display area on a one-to-one basis in order of descending priority in accordance with a positional relationship between the display areas and the one or more search targets; and the display control unit 15 that generates an image for display in which a first icon image corresponding to a search target is arranged in a display area on the basis of an assignment result provided by the search target assigning unit 14, and that causes the display device 4 to display a screen including the image for display. As a result, both visibility and browsability in the display screen can be achieved irrespective of the arrangement density of search targets on a map.

Further, the display control method of Embodiment 1 includes the steps of: in the priority assigning unit 12, assigning a priority to each of multiple display areas arranged in a grid pattern (step ST1); in the position information acquiring unit 13, acquiring position information indicating the position of each of one or more search targets existing in a search region (step ST2); in the search target assigning unit 14, assigning a search target to a display area on a one-to-one basis in order of descending priority in accordance with a positional relationship between the display areas and the one or more search targets (step ST3); and in the display control unit 15, generating an image for display in which a first icon image corresponding to a search target is arranged in a display area on the basis of an assignment result provided by the search target assigning unit 14, and causing the display device 4 to display a screen including the image for display (step ST4). As a result, both visibility and browsability in the display screen can be achieved irrespective of the arrangement density of search targets on a map.

Embodiment 2

Figure 15:
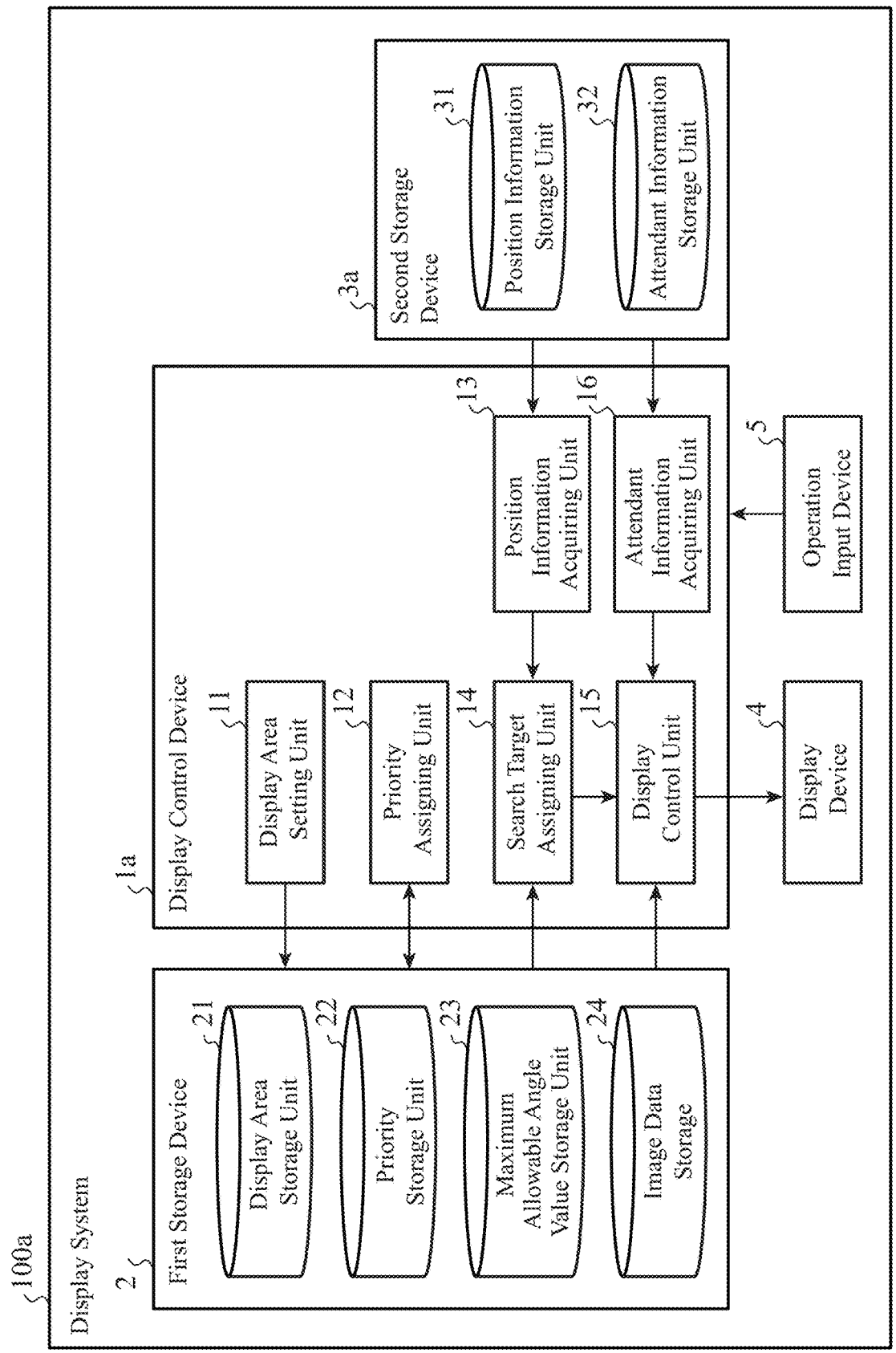
FIG. 15 is a block diagram showing a main part of a display control device according to Embodiment 2 of the present disclosure, and a main part of a display system including the display control device.

FIG. 15 is a block diagram showing a main part of a display control device according to Embodiment 2 of the present disclosure, and a main part of a display system including this display control device. Referring to FIG. 15, the display control device 1a of Embodiment 2 and the display system 100a including this display control device 1a will be explained. In FIG. 15, the same blocks as those in the block diagram of Embodiment 1 shown in FIG. 1 are denoted by the same reference characters, and an explanation of the blocks will be omitted hereafter. Further, because the hardware configuration of the display control device 1a is the same as that explained by referring to FIG. 4 in Embodiment 1, an illustration and an explanation of the hardware configuration will be omitted.

An attendant information storage unit 32 stores information (referred to as "first attendant information" hereafter) indicating the type or the state of each search target, and so on.

Concretely, for example, in a case in which the display system 100a is applied to an equipment management system and each search target is equipment, the first attendant information indicates the type of each equipment, whether or not there is a need to quickly dispatch a maintenance engineer to each equipment, the presence or absence of a maintenance engineer who is performing inspection work or maintenance work on each equipment, a skill of each maintenance engineer in performing inspection work or maintenance work, how much spare time each maintenance engineer has, and so on. As an alternative, for example, in a case in which the display system 100a is applied to a navigation system for in-vehicle information terminals and each search target is a parking lot, the first attendant information indicates the parking space availability state of each parking lot, and so on. As an alternative, for example, in a case in which the display system 100a is applied to a navigation system for mobile information terminals and each search target is a railway station, the first attendant information indicates the presence or absence of a shopping district in the vicinity of each station, whether or not the distance between any two adjacent stations is within walking distance (e.g., whether or not the straight-line distance between any two adjacent stations is equal to or shorter than 2 kilometers), and so on.

Further, the attendant information storage unit 32 stores information (referred to as "second attendant information" hereafter) indicating a connection relationship between search targets.

Concretely, for example, in the case in which the display system 100a is applied to an equipment management system, and each search target is equipment, the second attendant information indicates a connection relationship between pieces of equipment in a patrol route of a maintenance engineer. More specifically, in a case in which multiple pieces of equipment are included in a patrol route of one maintenance engineer or one group of maintenance engineers, the second attendant information indicates that there is a connection relationship among these pieces of equipment. As an alternative, for example, in the case in which the display system 100a is applied to a navigation system for mobile information terminals, and each search target is a station of a railway, the second attendant information indicates a connection relationship between stations in each line or each route of the railway.

Hereafter, the first attendant information and the second attendant information may be generically and simply referred to as the "attendant information." An attendant information acquiring unit 16 acquires the attendant information stored in the attendant information storage unit 32. The attendant information acquiring unit 16 outputs the acquired attendant information to a display control unit 15.

Image data about an icon image corresponding to the type, the state, or the like of each search target, indicated by the first attendant information, is stored in an image data storage 24. The display control unit 15 generates an image for display by using the icon image corresponding to the type, the state, or the like of each search target, indicated by the first attendant information.

Further, the display control unit 15 generates the image for display in such a way that the image for display includes a substantially line-shaped image (referred to as a "linear image" hereafter) in which icon images are connected on the basis of the connection relationship indicated by the second attendant information. At this time, the display control unit 15 may display a part of the linear image which overlaps an icon image, out of the linear image, in a display mode different from that for another part of the linear image. Concretely, for example, the display control unit 15 may display a part of the linear image which overlaps an icon image, as a broken line, and display another part of the linear image as a solid line.

A second storage device 3a is constituted by a position information storage unit 31 and the attendant information storage unit 32. The display control device 1a is constituted by a display area setting unit 11, a priority assigning unit 12, a position information acquiring unit 13, a search target assigning unit 14, the display control unit 15, and the attendant information acquiring unit 16. The display system 100a is constituted by the display control device 1a, a first storage device 2, the second storage device 3a, a display device 4, and an operation input device 5.

Figure 16:
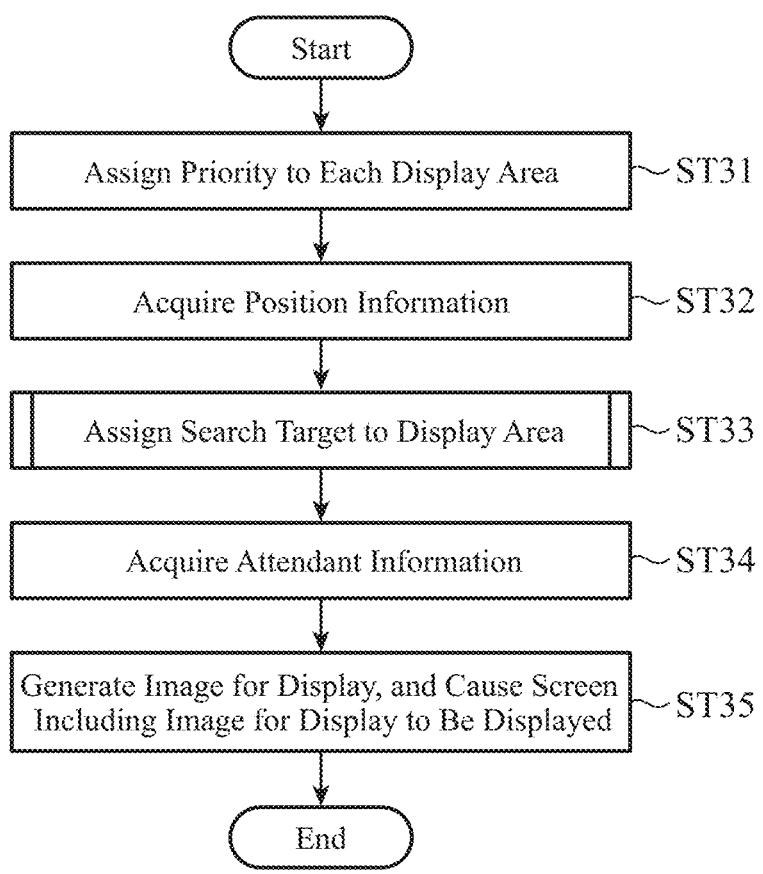
FIG. 16 is a flowchart showing the operation of the display control device according to Embodiment 2 of the present disclosure.

Next, the operation of the display control device 1a will be explained by referring to a flowchart of FIG. 16. It is assumed that when the display control device 1a starts a process of step ST31, display area information is already stored in the display area storage unit 21. Further, a maximum allowable angle value $\chi$ is stored in a maximum allowable angle value storage unit 23 in advance, image data is stored in the image data storage 24 in advance, and pieces of position information are stored in the position information storage unit 31 in advance.

First, the priority assigning unit 12 performs a process of step ST31, the position information acquiring unit 13 then performs a process of step ST32, and the search target assigning unit 14 then performs a process of step ST33. Because the details of the processes of steps ST31 to ST33 are the same as those of the processes of steps ST1 to ST3 shown in FIG. 5, an explanation of the processes will be omitted hereafter. Further, because the details of the process of step ST33 are the same as that explained by referring to the flowchart of FIG. 6 in Embodiment 1, an illustration and an explanation of the process will be omitted hereafter.

Then, in step ST34, the attendant information acquiring unit 16 acquires the attendant information stored in the attendant information storage unit 32. The attendant information acquiring unit 16 outputs the acquired attendant information to the display control unit 15.

Then, in step ST35, the display control unit 15 acquires the display area information stored in the display area storage unit 21, the image data stored in the image data storage 24, and an assignment result and distances d that the search target assigning unit 14 outputs in step ST33, and the attendant information that the attendant information acquiring unit 16 outputs in step ST34. The display control unit 15 generates an image for display by using these pieces of information. The image for display is one in which an icon image corresponding to each search target is arranged in a corresponding display area on the basis of the assignment result provided by the search target assigning unit 14.

At this time, the display control unit 15 causes the icon image corresponding to each search target to be displayed in a different display mode depending on the distance d from a reference position P to the search target. Concretely, for example, the display control unit 15 makes the size of the icon image smaller with increase in the distance d. As an alternative, for example, the display control unit 15 makes the degree of transparency of the icon image higher with increase in the distance d. As an alternative, for example, the display control unit 15 makes the size of the icon image smaller and makes the degree of transparency of the icon image higher with increase in the distance d.

Further, at this time, the display control unit 15 generates the image for display by using the icon image corresponding to the type, the state, or the like of each search target, which is indicated by the first attendant information. In addition, at this time, the display control unit 15 generates the image for display in such a way that the image for display includes a linear image in which icon images are connected on the basis of the connection relationship indicated by the second attendant information.

Further, in step ST35, the display control unit 15 causes the display device 4 to display a screen including the generated image for display. More concretely, the display control unit 15 causes the display device 4 to display a screen including the inside of a region to be displayed of the image for display.

Next, a concrete example of the image for display generated by the display control device 1a will be explained by referring to FIG. 17. In the figure, a numeral shown in the icon image corresponding to each search target shows an identifier assigned to this search target.

Figure 17A:
FIG. 17A is an explanatory drawing showing another example of an image for comparison generated by a conventional display control device.

FIG. 17A shows, as an object for comparison with the image for display generated by the display control device 1a, an image generated by a conventional display control device, i.e., an image for comparison I4'. The image for comparison I4' is one in which a circular icon image I' corresponding to a reference point P' and a circular icon image corresponding to each search target are superimposed on a map image on the basis of positions indicated by position information. Further, the image for comparison I4' includes a linear image in which icon images are connected on the basis of the connection relationship indicated by the second attendant information.

Figure 17B:
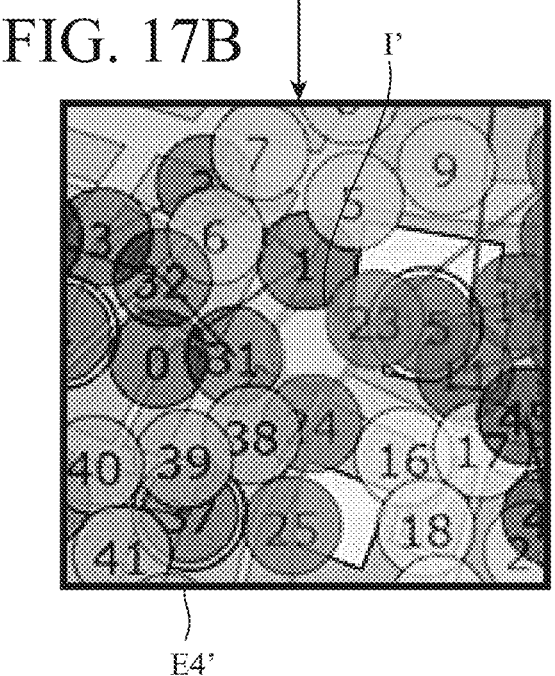
FIG. 17B is an explanatory drawing showing the inside of a region of the image for comparison shown in FIG. 17A, the region corresponding to a region to be displayed.

FIG. 17B shows the inside of a region E4' corresponding to the region to be displayed of the images for comparison I4'. In the example shown in FIG. 17B, the icon image I' corresponding to the reference point P' is arranged at the center of the region E4'. The conventional display control device causes a display device to display a screen including the inside of the region E4' of the image for comparison I4'.

Figure 17C:
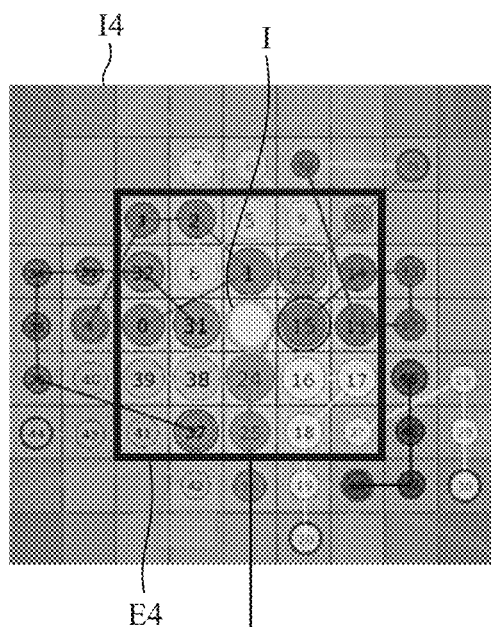
FIG. 17C is an explanatory drawing showing an example of an image for display generated by the display control device according to Embodiment 2 of the present disclosure.

FIG. 17C shows the image for display I4 generated by the display control device 1a of Embodiment 2. More specifically, the image for display I4 is based on both the same position information as that for the image for comparison I4', and the same second attendant information as that for the image for comparison I4'. Further, an icon image I corresponds to the reference position P.

Figure 17D:
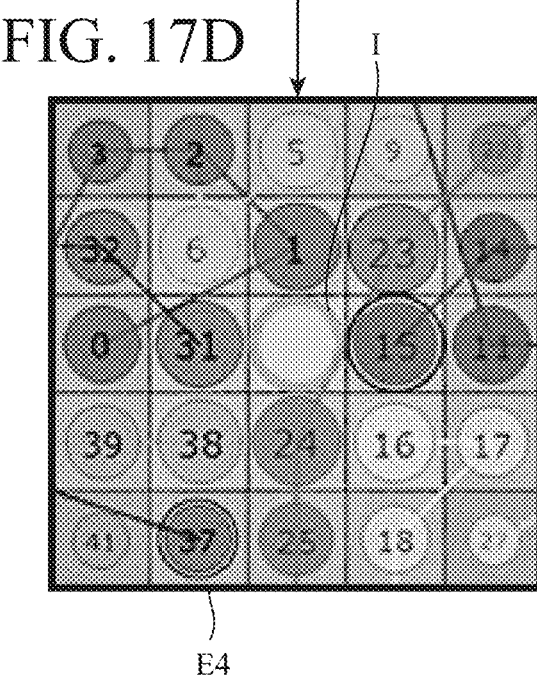
FIG. 17D is an explanatory drawing showing the inside of the region to be displayed of the image for display shown in FIG. 17C.

FIG. 17D shows the inside of a region to be displayed E4 of the images for display I4. In the example shown in FIG. 17D, the icon image I corresponding to the reference position P is arranged at the center of the region to be displayed E4. The display control device 1a of Embodiment 2 causes the display device 4 to display a screen including the inside of the region to be displayed E4 of the images for display I4.

In the display screen provided by the conventional display control device, as the arrangement density of search targets in the vicinity of the reference point P' increases (FIG. 17A), the arrangement density of icon images in the display screen also increases (FIG. 17B). Therefore, there occurs a state in which icon images overlap one another, and there further occurs a state in which an icon image and a linear image overlap each other (FIG. 17B). As a result, a problem is that in addition to the difficulty of visually grasping the position of the search target corresponding to each icon image, it is difficult to visually grasp a connection relationship between search targets. A further problem is that when each icon image corresponds to the type, the state, or the like of a search target, indicated by the first attendant information, though not illustrated in FIG. 17, it is also difficult to visually grasp the type, the state, or the like of each search target because of overlapping of icon images.

In contrast with this, in the display control device 1a of Embodiment 2, there occurs a state in which icon images are arranged in a grid pattern, thereby being able to prevent a state in which icon images overlap one another from occurring, even when the arrangement density of search targets in the vicinity of the reference point P' is high (FIG. 17C). As a result, the visibility of the linear image is improved further compared with that of the screen of the image for comparison I4' (FIG. 17B), and it becomes easier to visually grasp a connection relationship between search targets (FIG. 17D). Further, when each icon image corresponds to the type, the state, or the like of a search target, indicated by the first attendant information, though not illustrated to FIG. 17, it becomes easier to visually grasp the type, the state, or the like of each search target because any overlapping of icon images is avoided.

Next, by referring to FIGS. 18 to 20, an example of the display screen in the case in which the display system 100a is applied to an equipment management system, a navigation system for in-vehicle information terminals, or a navigation system for mobile information terminals will be explained.

Figure 18:
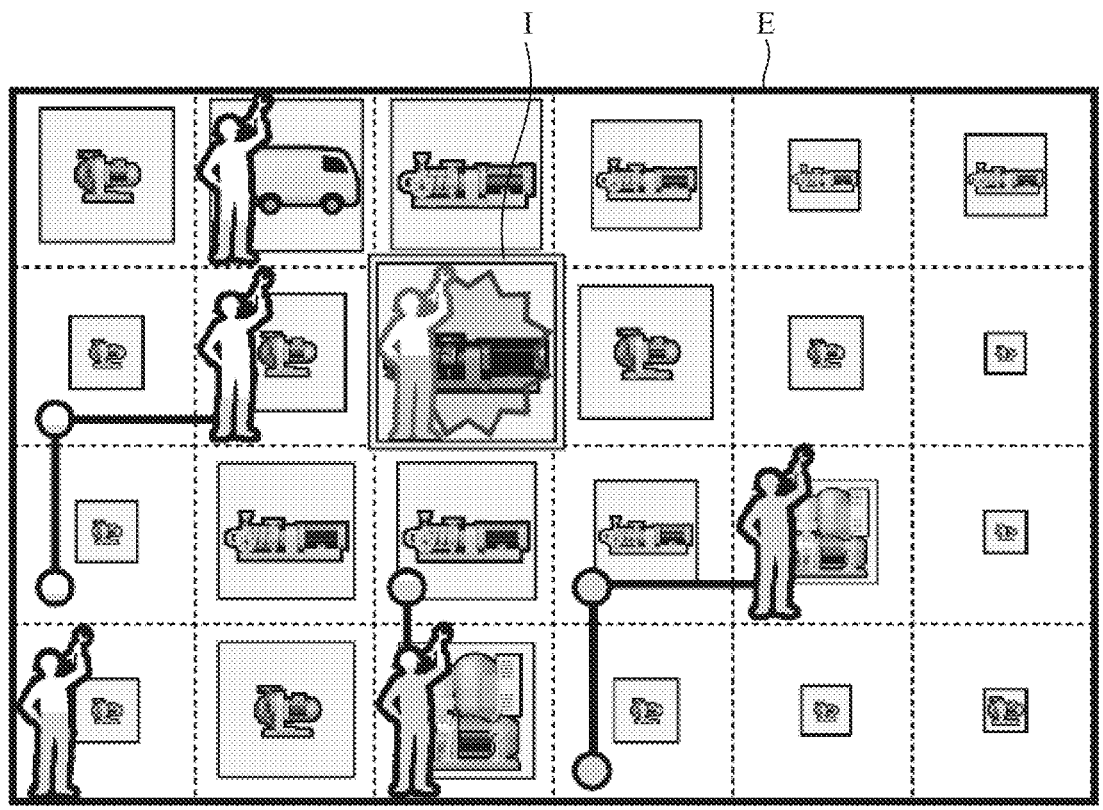
FIG. 18 is an explanatory drawing showing an example of a display screen in a case in which the display control device according to Embodiment 2 of the present disclosure is applied to an equipment management system.

FIG. 18 is an example of the display screen in the case in which the display system 100a is applied to an equipment management system. More specifically, each search target is equipment such as a storage pump or an elevator, and a point corresponding to equipment that needs quickly dispatch of a maintenance engineer is set as the reference point P'. In the example shown in FIG. 18, an icon image I corresponding to the position of the equipment at the reference point P', i.e., the reference position P is arranged at the center of the region to be displayed E (more strictly, in an upper left display area with respect to the center of the region to be displayed E). The first attendant information indicates the type of each equipment, whether or not there is a need to quickly dispatch a maintenance engineer to each equipment, the presence or absence of a maintenance engineer who is performing inspection work or maintenance work on each equipment, a skill of each maintenance engineer in performing inspection work or maintenance work, and how much spare time each maintenance engineer has. The second attendant information indicates a connection relationship between pieces of equipment in a patrol route of a maintenance engineer.

An icon image corresponding to equipment on which a maintenance engineer is performing inspection work or maintenance work is constituted by a combination of a subicon image showing the equipment and a subicon image showing the maintenance engineer, and an icon image corresponding to any other equipment is constituted by only a subicon image showing the other equipment. Further, while the size of a subicon image showing each equipment, out of these subicon images, differs depending on the distance d, the size of the subicon image showing the maintenance engineer is fixed irrespective of the distance d.

The subicon image showing each equipment is an icon image corresponding to the type of this equipment indicated by the first attendant information. The subicon image showing the maintenance engineer is an icon image in which a colored area thereof differs in accordance with the skill or the length of the spare time of the maintenance engineer, the skill or the length of the spare time being indicated by the first attendant information. Further, a linear image corresponding to the patrol route of the maintenance engineer is shown on the basis of the second attendant information. The icon image I corresponding to the equipment at the reference point P' corresponds to the equipment that needs quickly dispatch of a maintenance engineer, and is displayed in a display mode different from that for any other equipment (concretely, displayed in a different color and provided with a visual effect for exclusive use).

Figure 19:
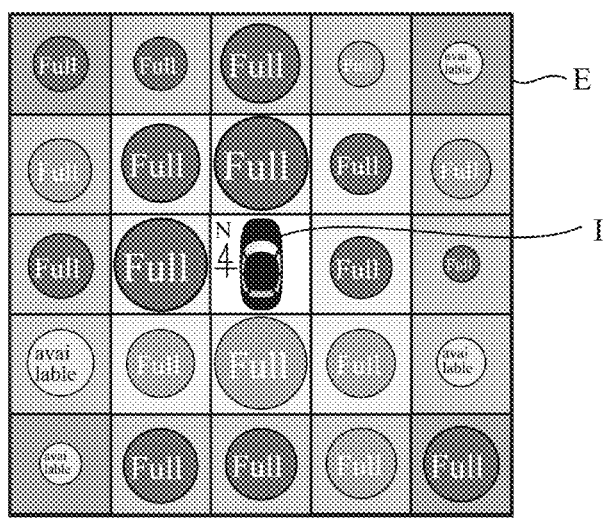
FIG. 19 is an explanatory drawing showing an example of the display screen in a case in which the display control device according to Embodiment 2 of the present disclosure is applied to a navigation system for in-vehicle information terminals.

FIG. 19 is an example of the display screen in the case in which the display system 100a is applied to a navigation device for an in-vehicle information terminal. More specifically, each search target is a parking lot, and a point corresponding to the current position of a vehicle in which the in-vehicle information terminal is mounted is set as the reference point P'. In the example shown in FIG. 19, an icon image I corresponding to the position of the reference point P', i.e., the reference position P is arranged at the center of the region to be displayed E. The first attendant information indicates the parking space availability state of each parking lot, and the second attendant information does not exist. An icon image corresponding to each parking lot corresponds to the parking space availability state of this parking lot.

The driver of the vehicle can intuitively grasp that "parking lots are full even if going further northwestward" by visually recognizing an upper left portion of the screen illustrated in FIG. 19. Further, the driver of the vehicle can "find that I have passed by, but there is a vacant parking lot near here" by visually recognizing a lower left portion of the screen illustrated in FIG. 19.

Figure 20A:
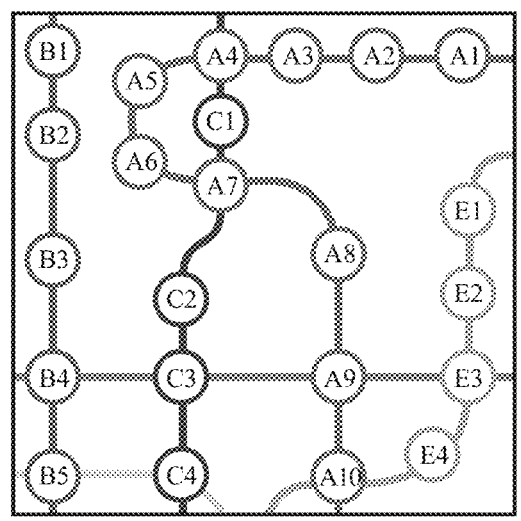
FIG. 20A is an explanatory drawing showing an example of a railway line figure.
Figure 20B:
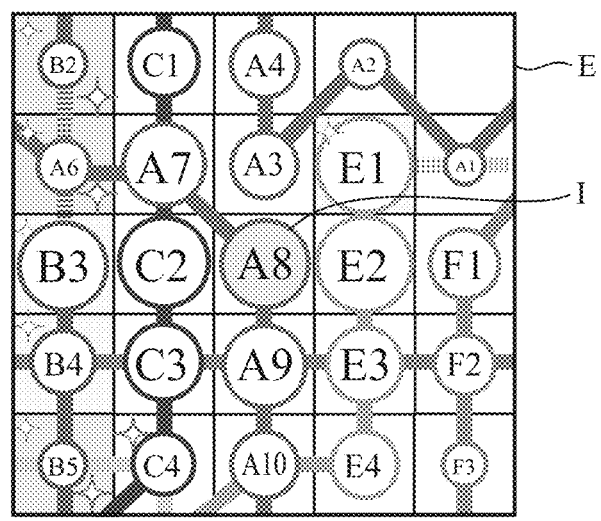
FIG. 20B is an explanatory drawing showing an example of a display screen in a case in which the display control device according to Embodiment 2 of the present disclosure is applied to a navigation system for mobile information terminals.

FIG. 20B is an example of the screen in which a railway map shown in FIG. 20A is displayed simply, in the case in which the display system 100a is applied to a navigation device for a mobile information terminal. More specifically, each search target is a railway station, and a point corresponding to a station that is closest to the current position of the mobile information terminal is set as the reference point P'. In the example shown in FIG. 20, an icon image I corresponding to the position of the station at the reference point P', i.e., the reference position P is arranged at the center of the region to be displayed E. The first attendant information indicates the presence or absence of a shopping district in the vicinity of each station, and whether or not the distance between any two adjacent stations is equal to or shorter than walking distance. The second attendant information indicates a connection relationship between stations in each line or each route.

An icon image corresponding to a station located within walking distance from the station at the reference point P' is displayed in a background color different from that of icon images corresponding to other stations. Further, for an icon image corresponding to a station with a shopping district, a visual effect to cause the icon image to appear brightly is provided. The user of the navigation system can intuitively grasp that "the user can walk to the station E1 seems to be in walking distance", "the east side is not prosperous", and "the station A6 is the shopping district accessible without change from the station A8", and so on by visually recognizing the screen illustrated in FIG. 20B.

Here, in the railway map shown in FIG. 20A, although the stations B2 and B3 are connected by a line, the station B2 and A6 are not connected by any line and the station A6 and B3 are not connected by any line. However, in the screen shown in FIG. 20B, an icon image showing the station A6 is arranged while being superimposed on a linear image in which the icon image showing the station B2 and the icon image showing the station B3 are connected. Accordingly, it is expressed that it is impossible to go from the station A6 directly to each of the stations B2 and B3 by displaying the linear image as a broken line.

The same various variants as those explained in Embodiment 1 can be adopted for the display control device 1a and the display system 100a. Concretely, for example, the display control unit 15 may generate an image for display including second icon images that are arranged on the basis of the positions indicated by the position information, in addition to the first icon images that are arranged on the basis of the assignment result provided by the search target assigning unit 14. As an alternative, for example, the display area setting unit 11 may be eliminated from the display control device 1a, like in the example shown in FIG. 14.

As mentioned above, the display control device 1a of Embodiment 2 includes the attendant information acquiring unit 16 that acquires the first attendant information indicating the type or state of each search target, and the display control unit 15 generates an image for display in which a first icon image corresponding to the type or state of each search target is arranged in a display area. As a result, a screen design that makes it easy to visually grasp the type, the state or the like of each search target can be implemented.

Further, the display control device 1a of Embodiment 2 includes the attendant information acquiring unit 16 that acquires the second attendant information indicating a connection relationship between search targets, and the display control unit 15 generates an image for display including a linear image in which first icon images are connected on the basis of the connection relationship. As a result, a screen design that makes it easy to visually grasp a connection relationship between search targets can be implemented.

It is to be understood that any combination of two or more of the above-mentioned embodiments can be made, various changes can be made in any component according to any one of the above-mentioned embodiments, and any component according to any one of the above-mentioned embodiments can be omitted within the scope of the present disclosure.

INDUSTRIAL APPLICABILITY

The display control device of the present disclosure can be applied to, for example, an equipment management system, a navigation system for in-vehicle information terminals, or a navigation system for mobile information terminals.

REFERENCE SIGNS LIST 1, 1a display control device, 2 first storage device, 3, 3a second storage device, 4 display device, 5 operation input device, 11 display area setting unit, 12 priority assigning unit, 13 position information acquiring unit, 14 search target assigning unit, 15 display control unit, 16 attendant information acquiring unit, 21 display area storage unit, 22 priority storage unit, 23 maximum allowable angle value storage unit, 24 image data storage, 31 position information storage unit, 32 attendant information storage unit, 41 processor, 42 memory, 43 processing circuit, and 100, 100a display system.

The invention claimed is:

1. A display control device comprising:
a processor; and
a memory storing instructions, upon executed by the processor, causing the processor to
perform a process of:
assigning a priority to each of multiple display areas arranged in a grid pattern;
acquiring position information indicating a position of each of one or more search targets existing in a search region;
assigning a search target to a display area on a one-to-one basis in order of descending priority in accordance with a positional relationship between the display areas and the one or more search targets; and
generating an image for display in which a first icon image corresponding to the search target is arranged in the display area on a basis of an assignment result provided by the process, and causing a display device to display a screen including the image for display,
wherein the process assigns the priority in such a way that the priority gradually becomes lower with increasing distance from a reference position, and
wherein the process calculates a first vector indicating a direction of a center of each of the display areas with respect to the reference position, a second vector indicating a direction of each of the one or more search targets with respect to the reference position, and a distance from the reference position to each of the one or more search targets, and assigns, to the display area in order of descending priority, the search target having a smallest evaluated value that depends on the distance thereof, out of yet-to-be-assigned search targets in each of which an angle value between the first vector and the second vector is less than an allowable angle value.

2. The display control device according to claim 1, wherein the process causes the first icon image corresponding to the search target to be displayed in a different display mode depending on the distance from the reference position to the search target.

3. The display control device according to claim 2, wherein the process causes the first icon image corresponding to the search target to be displayed in a different size or with a different degree of transparency depending on the distance from the reference position to the search target.

4. The display control device according to claim 1, wherein the first icon image includes multiple subicon images, and the process causes one or more of the subicon images of the first icon image corresponding to the search target to be displayed in a different display mode depending on the distance from the reference position to the search target.

5. The display control device according to claim 4, wherein the process causes the one or more of the subicon images of the first icon image corresponding to the search target to be displayed in a different size or with a different degree of transparency depending on the distance from the reference position to the search target.

6. The display control device according to claim 1, wherein the process comprises acquiring first attendant information indicating a type or state of each of the one or more search targets, and the process generates an image for display in which a first icon image corresponding to the type or state of the search target is arranged in a display area.

7. The display control device according to claim 1, wherein the process comprises acquiring second attendant information indicating a connection relationship between search targets, and the process generates an image for display including a linear image in which first icon images are connected on a basis of the connection relationship.

8. The display control device according to claim 7, wherein the process causes a part of the linear image overlapping a first icon image, to be displayed in a display mode different from that for another part of the linear image.

9. The display control device according to claim 8, wherein the process causes the part of the linear image overlapping a first icon image, to be displayed as a broken line, and causes the other part to be displayed as a solid line.

10. The display control device according to claim 1, wherein the display areas include polygon-shaped display areas arranged in a polygonal grid pattern, and wherein a size of one or more of the display areas differs from those of other display areas.

11. The display control device according to claim 1, wherein the display areas include polygon-shaped display areas arranged in a polygonal grid pattern, and wherein a shape of one or more of the display areas differs from those of other display areas.

12. The display control device according to claim 1, wherein the process generates an image for display including a second icon image corresponding to a search target, and the second icon image is arranged on a basis of a position indicated by position information.

13. The display control device according to claim 12, wherein the process causes the first icon image and the second icon image to be displayed in mutually different display modes.

14. A display control method comprising:

assigning a priority to each of multiple display areas arranged in a grid pattern;

acquiring unit, acquiring position information indicating a position of each of one or more search targets existing in a search region;

assigning a search target to a display area on a one-to-one basis in order of descending priority in accordance with a positional relationship between the display areas and the one or more search targets; and generating an image for display in which a first icon image corresponding to a search target is arranged in a display area on a basis of an assignment result provided by the search target assigning step, and causing a display device to display a screen including the image for display, and wherein the priority assigning step assigns the priority in such a way that the priority gradually becomes lower with increasing distance from a reference position, and wherein the search target assigning step calculates a first vector indicating a direction of a center of each of the display areas with respect to the reference position, a second vector indicating a direction of each of the one or more search targets with respect to the reference position, and a distance from the reference position to each of the one or more search targets, and assigns, to the display area in order of descending priority, the search target having a smallest evaluated value that depends on the distance thereof, out of yet-to-be-assigned search targets in each of which an angle value between the first vector and the second vector is less than an allowable angle value.

* * * * *